US012591118B2

(12) United States Patent
Zhang et al.

(10) Patent No.: US 12,591,118 B2
(45) Date of Patent: Mar. 31, 2026

(54) ELECTRONIC DEVICE HAVING A LENS ASSEMBLY EMPLOYING AN AVOIDANCE SPACE IN CONJUNCTION WITH A TOTAL TRACK LENGTH

(71) Applicant: HUAWEI TECHNOLOGIES CO., LTD., Shenzhen (CN)

(72) Inventors: Kaiyuan Zhang, Dongguan (CN); Xiaofang Wang, Dongguan (CN); Kai Chen, Dongguan (CN); Ruiming Ding, Dongguan (CN); Xiaoheng Ding, Dongguan (CN); Sichen Long, Dongguan (CN); Long Li, Dongguan (CN); Yidong Gao, Shenzhen (CN); Li-Te Kuo, Dongguan (CN); Haishui Ye, Shanghai (CN); Wei Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 43 days.

(21) Appl. No.: 18/845,222

(22) PCT Filed: Mar. 7, 2023

(86) PCT No.: PCT/CN2023/080164
§ 371 (c)(1),
(2) Date: Sep. 9, 2024

(87) PCT Pub. No.: WO2023/169441
PCT Pub. Date: Sep. 14, 2023

(65) Prior Publication Data
US 2025/0199270 A1     Jun. 19, 2025

(30) Foreign Application Priority Data
Mar. 10, 2022     (CN) .......................... 202210240794.3

(51) Int. Cl.
*H04N 5/335* (2011.01)
*G02B 7/02* (2021.01)
(Continued)

(52) U.S. Cl.
CPC ........... *G02B 13/0045* (2013.01); *G02B 7/02* (2013.01); *G03B 30/00* (2021.01)

(58) Field of Classification Search
None
See application file for complete search history.

(56) References Cited

U.S. PATENT DOCUMENTS 10,191,248 B2     1/2019   Hashimoto
2025/0180871 A1*  6/2025   Zhang ..................... G02B 13/00

FOREIGN PATENT DOCUMENTS

CN     112782833 A     5/2021
CN     113552706 A     10/2021
(Continued)

OTHER PUBLICATIONS

Sunex.com [online], "'Scaling' as a lens design tool," Sep. 12, 2019, retrieved on Jun. 20, 2025, retrieved from URL<https://sunex.com/2019/09/12/scaling-as-a-lens-design-tool/>, 2 pages.
(Continued)

*Primary Examiner* — Gary C Vieaux
(74) *Attorney, Agent, or Firm* — Fish & Richardson P.C.

(57) ABSTRACT

An example electronic device is provided, including a housing, a lens cover, and a lens assembly disposed in the housing. The lens assembly includes a plurality of lenses sequentially arranged from an object side to an image side along an optical axis. The lens assembly satisfies a conditional expression: $0.7<IH/(4*F\ \#)<6$, where IH is a total image height of the lens assembly, and F # is an F-number of the lens assembly. At least one lens that is in the lens assembly and that is close to the object side is configured to (Continued)

move along the optical axis. An equivalent focal length of the lens assembly is between 18 mm and 30 mm.

20 Claims, 18 Drawing Sheets

(51) Int. Cl.
    *G02B 13/00*       (2006.01)
    *G03B 30/00*       (2021.01)

(56)           References Cited

FOREIGN PATENT DOCUMENTS

| | | |
|---|---|---|
| CN | 110471168 B | 1/2022 |
| CN | 114047595 A | 2/2022 |
| CN | 215867304 U | 2/2022 |
| JP | 2013195637 A | 9/2013 |

OTHER PUBLICATIONS

Extended European Search Report in European Appln. No. 23766019. 6, mailed on May 15, 2025, 10 pages.
International Search Report and Written Opinion in International Appln. No. PCT/CN2023/080164, mailed on Apr. 23, 2023, 16 pages (with English translation).

\* cited by examiner

F1: T Diff. Limit
F1: R Diff. Limit
F1: T (RIH) 0.000 mm
F1: R (RIH) 0.000 mm
F2: T (RIH) 0.817 mm
F2: R (RIH) 0.817 mm
F3: T (RIH) 1.633 mm
F3: R (RIH) 1.633 mm
F4: T (RIH) 2.450 mm
F4: R (RIH) 2.450 mm
F5: T (RIH) 3.266 mm
F5: R (RIH) 3.266 mm
F6: T (RIH) 4.083 mm
F6: R (RIH) 4.083 mm
F7: T (RIH) 4.900 mm
F7: R (RIH) 4.900 mm
F8: T (RIH) 5.716 mm
F8: R (RIH) 5.716 mm
F9: T (RIH) 6.533 mm
F9: R (RIH) 6.533 mm
F10: T (RIH) 7.349 mm
F10: R (RIH) 7.349 mm
F11: T (RIH) 8.166 mm
F11: R (RIH) 8.166 mm F1: T Diff. Limit
F1: R Diff. Limit
F1: T (RIH) 0.000 mm
F1: R (RIH) 0.000 mm
F2: T (RIH) 0.817 mm
F2: R (RIH) 0.817 mm
F3: T (RIH) 1.633 mm
F3: R (RIH) 1.633 mm
F4: T (RIH) 2.450 mm
F4: R (RIH) 2.450 mm
F5: T (RIH) 3.266 mm
F5: R (RIH) 3.266 mm
F6: T (RIH) 4.083 mm
F6: R (RIH) 4.083 mm
F7: T (RIH) 4.900 mm
F7: R (RIH) 4.900 mm
F8: T (RIH) 5.716 mm
F8: R (RIH) 5.716 mm
F9: T (RIH) 6.533 mm
F9: R (RIH) 6.533 mm
F10: T (RIH) 7.349 mm
F10: R (RIH) 7.349 mm
F11: T (RIH) 8.166 mm
F11: R (RIH) 8.166 mm

ELECTRONIC DEVICE HAVING A LENS ASSEMBLY EMPLOYING AN AVOIDANCE SPACE IN CONJUNCTION WITH A TOTAL TRACK LENGTH

CROSS-REFERENCE TO RELATED APPLICATIONS

This application is a National Stage of International Application No. PCT/CN2023/080164, filed on Mar. 7, 2023, which claims priority to Chinese Patent Application No. 202210240794.3, filed on Mar. 10, 2022, both of which are hereby incorporated by reference in their entireties.

TECHNICAL FIELD

This application relates to the field of terminal technologies, and in particular, to an electronic device.

BACKGROUND

In recent years, with development of camera technologies, camera modules on electronic consumer products, such as a mobile phone, a tablet, a notebook computer, and a wearable device, gradually develop to be miniaturized and thin, photographing effect and requirements of the camera module are expected to be as high as those of single-lens reflex cameras, and a volume and function effect of the camera module have gradually become one of important features of terminal electronic devices.

Currently, the camera module includes a lens assembly and an image sensor. Light may enter the camera module through the lens assembly, and is irradiated on the image sensor for imaging. To meet requirements of people for imaging quality, the lens assembly gradually develops toward imaging with a wide aperture and a large optical format (a target size of the image sensor). For example, user requirements for capturing snapshots of scene details gradually increase, so that a wide aperture design becomes particularly important. In addition, an aperture of the camera module directly affects core functions of a camera, such as night scene photographing, video shooting, and background blurring. In addition, a lens with a large optical format and a wide aperture is generally implemented with more design freedom by increasing a quantity of optical elements (such as lenses) or the like.

However, a design of both the wide aperture and the large optical format causes an increase in a total track length (total track length, TTL for short) of the lens assembly, and increases space for the camera module. This is not conducive to a thinning design of the electronic device.

SUMMARY

This application provides an electronic device, to resolve a problem that a total track length of an existing lens assembly with a wide aperture and a large optical format is long, which is not conducive to a thinning design of the electronic device.

The electronic device provided in this application includes a housing, a lens cover, and a lens assembly disposed in the housing. The lens assembly includes a plurality of lenses that are sequentially arranged from an object side to an image side along an optical axis.

The lens cover is located on one side that is of the lens assembly and that faces the object side. The lens cover may extend out of the housing along the optical axis to form avoidance space. The entire lens assembly or at least one lens that is in the lens assembly and that is close to the object side moves in the avoidance space along the optical axis.

The lens assembly satisfies a conditional expression: $0.7 < IH/(4*F\ \#) < 6$, where IH is a total image height of the lens assembly, and F # is an F-number of the lens assembly. In this way, the lens assembly may have a small F-number and a large total image height. A smaller F-number indicates a larger aperture, that is, performance, of the lens assembly, in which both a wide aperture and a large optical format are included may be implemented. This improves imaging performance of the lens assembly and improves imaging quality.

Moreover, the lens cover may move along the optical axis. When the electronic device needs to be used to perform a photographing operation, the lens cover may move along the optical axis and extend out of the housing, and a camera module is in a working state. The movement of the lens cover leaves the avoidance space. The entire lens assembly or the at least one lens that is in the lens assembly and that is close to the object side may move along the optical axis in the avoidance space, to implement a focusing function and improve the imaging quality.

After photographing is completed, the entire lens assembly or the at least one lens that is in the lens assembly and that is close to the object side may move toward an image sensor along the optical axis, and the camera module is in a non-working state. The camera module may not be restricted by imaging requirements such as a total track length. The lens cover and the lens assembly may be in a retracted state. That is, the lens cover and the lens assembly may be as close as possible, and the lens assembly and the image sensor (or a light filter) may be as close as possible, to reduce space for the entire camera module, so that a thinning design requirement of the electronic device is met. In other words, according to the camera module in the electronic device provided in this application, while a high-quality imaging requirement in which the wide aperture and the large optical format are considered is implemented, space for the camera module in the non-working state is effectively reduced. This helps reduce space required by the camera module in a thickness direction of the electronic device, and helps a thinning design of the electronic device.

In a possible implementation, a cover driving apparatus and a lens driving apparatus are further included. The cover driving apparatus is configured to drive the lens cover to move along the optical axis.

The lens driving apparatus is configured to drive the entire lens assembly to move along the optical axis, or the lens driving apparatus is configured to drive the at least one lens that is in the lens assembly and that is close to the object side to move along the optical axis. The cover driving apparatus and the lens driving apparatus are two relatively independent driving apparatuses. In other words, the lens assembly and the lens cover are respectively driven by two driving apparatuses, to implement decoupling between movement driving of the lens cover and movement driving of the lens assembly, so that the lens cover and the lens assembly are separately controlled to move along the optical axis in a decoupling manner. This can effectively reduce a precision requirement of the movement driving, helps improve movement accuracy, and facilitates implementation of control.

In a possible implementation, a retraction/extension ratio of the lens cover is less than 0.95. The lens cover has a good retraction effect. This helps further reduce a length size of the camera module when the lens cover and the lens assembly are in the retracted state, and further helps thinning of the electronic device.

In a possible implementation, an equivalent focal length of the lens assembly is 18 mm to 30 mm. In this way, the equivalent focal length is small, so that the lens assembly has a better light convergence capability. This helps improve definition and brightness of imaging and improve the imaging quality.

In a possible implementation, the plurality of lenses each have focal power.

The lens assembly includes at least a first lens, a second lens, a third lens, a fourth lens, and a fifth lens that are sequentially arranged from the object side to the image side. There are at least five lenses. This can provide a higher degree of freedom for a design of the lens assembly, and helps improve performance of the lens assembly.

In a possible implementation, an Abbe number vd1 of the first lens and an Abbe number vd2 of the second lens satisfy a conditional expression: |vd1−vd2|>60. There is a large difference between the Abbe number of the first lens and the Abbe number of the second lens. The first lens may be a lens with a high Abbe number, and the second lens may be a lens with a low Abbe number, so that complementary balance can be performed between the first lens and the second lens in terms of a dispersion capability. This reduces an imaging chromatic aberration and further improves the imaging quality.

In a possible implementation, a focal length f1 of the first lens and a total focal length f of the lens assembly satisfy a conditional expression: 0.5<|f1/f|≤1.4. This helps improve the imaging chromatic aberration of the lens assembly, and further helps improve the imaging quality of the lens assembly.

In a possible implementation, the first lens and the second lens satisfy a conditional expression: 10<CT1(R3+R4)/(R3−R4)<40, where CT1 is a thickness of a part that is of the first lens and that corresponds to the optical axis, R3 is a curvature radius of an object-side surface of the second lens, and R4 is a curvature radius of an image-side surface of the second lens.

In this way, shapes and locations of the first lens and the second lens may be allocated more properly, to facilitate processing and implementation of the first lens and the second lens.

In a possible implementation, there are 5 to 10 lenses. While a high degree of design freedom is provided for the lens assembly, a size of the lens assembly can also be reduced. This helps the thinning design of the electronic device and facilitates production and implementation.

In a possible implementation, the lens assembly further includes a sixth lens and a seventh lens that are sequentially arranged from the fifth lens to the image side.

The first lens has positive focal power, the second lens has negative focal power, the third lens has negative focal power, the fourth lens has positive focal power, the fifth lens has negative focal power, the sixth lens has positive focal power, and the seventh lens has negative focal power.

In a possible implementation, at least a part that is of an object-side surface of the first lens and that corresponds to the optical axis is a convex surface, and at least a part that is of an image-side surface of the first lens and that corresponds to the optical axis is a concave surface.

At least a part that is of the object-side surface of the second lens and that corresponds to the optical axis is a convex surface, and at least a part that is of the image-side surface of the second lens and that corresponds to the optical axis is a concave surface.

At least a part that is of an image-side surface of the third lens and that corresponds to the optical axis is a concave surface.

At least a part that is of an object-side surface of the fourth lens and that corresponds to the optical axis is a convex surface.

At least a part that is of an object-side surface of the fifth lens and that corresponds to the optical axis is a convex surface, and at least a part that is of an image-side surface of the fifth lens and that corresponds to the optical axis is a concave surface.

At least a part that is of an object-side surface of the sixth lens and that corresponds to the optical axis is a convex surface, and at least a part that is of an image-side surface of the sixth lens and that corresponds to the optical axis is a concave surface.

At least a part that is of an image-side surface of the seventh lens and that corresponds to the optical axis is a concave surface.

The lens assembly obtained in this way has characteristics of the wide aperture and the large optical format, and the imaging quality of the lens assembly is significantly improved.

In a possible implementation, the lens assembly further includes the third lens, the fourth lens, the fifth lens, a sixth lens, a seventh lens, and an eighth lens that are sequentially arranged from the second lens to the image side.

The first lens has positive focal power, the second lens has negative focal power, the third lens has positive focal power, the fourth lens has negative focal power, the fifth lens has positive focal power, the sixth lens has negative focal power, the seventh lens has positive focal power, and the eighth lens has negative focal power.

In a possible implementation, at least a part that is of an object-side surface of the first lens and that corresponds to the optical axis is a convex surface, and at least a part that is of an image-side surface of the first lens and that corresponds to the optical axis is a concave surface.

At least a part that is of the object-side surface of the second lens and that corresponds to the optical axis is a convex surface, and at least a part that is of the image-side surface of the second lens and that corresponds to the optical axis is a concave surface.

At least a part that is of an object-side surface of the third lens and that corresponds to the optical axis is a convex surface, and at least a part that is of an image-side surface of the third lens and that corresponds to the optical axis is a concave surface.

At least a part that is of an image-side surface of the fourth lens and that corresponds to the optical axis is a concave surface.

At least a part that is of an object-side surface of the fifth lens and that corresponds to the optical axis is a convex surface, and at least a part that is of an image-side surface of the fifth lens and that corresponds to the optical axis is a convex surface.

At least a part that is of an object-side surface of the sixth lens and that corresponds to the optical axis is a convex surface, and at least a part that is of an image-side surface of the sixth lens and that corresponds to the optical axis is a concave surface.

At least a part that is of an object-side surface of the seventh lens and that corresponds to the optical axis is a convex surface, and at least a part that is of an image-side surface of the seventh lens and that corresponds to the optical axis is a concave surface.

At least a part that is of an object-side surface of the eighth lens and that corresponds to the optical axis is a convex surface, and at least a part that is of an image-side surface of the eighth lens and that corresponds to the optical axis is a concave surface.

The lens assembly obtained in this way has the characteristics of the wide aperture and the large optical format, and the imaging quality of the lens assembly is significantly improved.

In a possible implementation, the image sensor is further provided. The image sensor is located on one side that is of the lens assembly and that faces the image side.

In a possible implementation, the lens assembly rotates around a first axis by using a first central point as a rotation center. The first central point coincides with a center of the image sensor. The first axis passes through the first central point. The first axis is parallel to a photosensitive surface of the image sensor. In this way, the lens assembly can rotate around the first axis relative to the image sensor, and functions of the lens assembly are enriched, so that the camera module is applicable to more photographing scenarios and photographing requirements, and photographing diversity and functional requirements of the electronic device are met.

In a possible implementation, a rotation angle of the lens assembly is +10 degrees to −10 degrees. This may reduce an increase in a size, occupied by the lens assembly in a thickness direction, caused by rotation of the lens assembly, and help reduce a size of the lens assembly while improving photographing function diversity of the lens assembly, so that the thinning design requirement of the electronic device is met.

In a possible implementation, the lens assembly moves in a first direction. The first direction is parallel to the photosensitive surface of the image sensor. In this way, the lens assembly can move in the first direction relative to the image sensor, and functions of the lens assembly are enriched, so that the lens assembly is applicable to more photographing scenarios, functional requirements for photographing are better met, and the electronic device has better and more abundant photographing functions.

In a possible implementation, a moving distance of the lens assembly is +1 mm to −1 mm. In this way, impact on the imaging quality caused by an excessively large moving distance may be reduced or avoided, and good imaging quality is ensured while a multi-scenario photographing requirement is met.

In a possible implementation, the light filter is further included. The light filter is located between the image sensor and the lens assembly. Light entering from the lens cover sequentially passes through the lens assembly and the light filter, and then is irradiated on the image sensor. The light filter may filter out stray light that is not conducive to imaging, to improve the imaging quality.

DESCRIPTIONS OF REFERENCE NUMERALS

Figure 1:
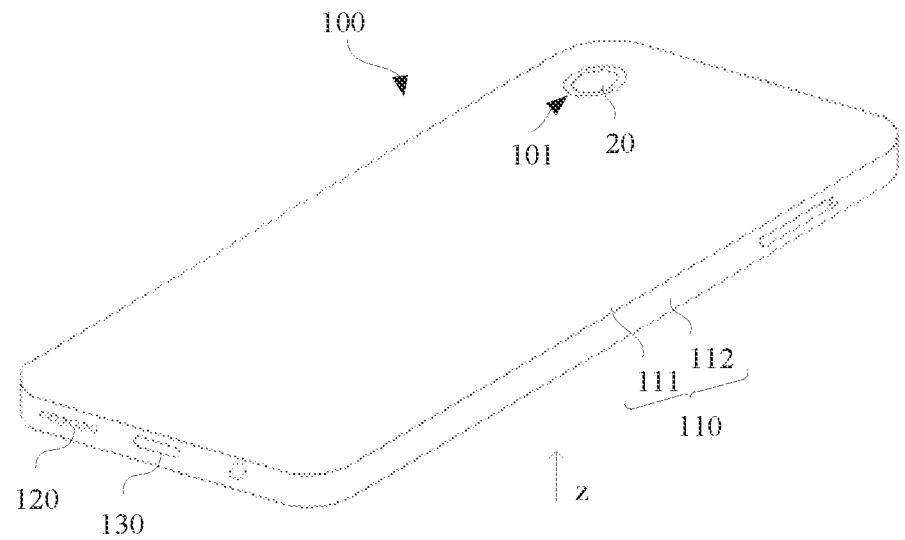
FIG. 1 is a schematic diagram of a back structure of an electronic device according to an embodiment of this application.

100: electronic device; 101: camera module; 10: lens assembly;
11: first lens; 12: second lens; 13: third lens;
14: fourth lens; 15: fifth lens; 16: sixth lens;
17: seventh lens; 18: eighth lens; 20: lens cover;
30: image sensor; 40: light filter; 50: stop.

DESCRIPTION OF EMBODIMENTS

Terms used in implementations of this application are merely used to explain specific embodiments of this application, but are not intended to limit this application.

For ease of understanding, related technical terms in embodiments of this application are first explained and described.

A focal length, also referred to as a focal length, is a measurement manner for measuring convergence or divergence of light in an optical system, and means a vertical distance from an optical center of a lens or a lens group to a focal plane when a clear image of an infinite scene is formed on the focal plane through the lens or the lens group. From a practical perspective, the focal length may be understood as a distance from a center of a lens (a lens assembly) to an image plane.

Equivalent focal length: Focal lengths of lens assemblies with different sizes of optical formats are converted into a focal length of a lens assembly corresponding to a photosensitive element of 35 mm, and a converted focal length is the equivalent focal length.

An optical axis is a straight line that passes through a center of each lens of a lens assembly.

An aperture is an apparatus configured to control an amount of light passing through a lens and entering an electronic device, and is usually in the lens. A size of the aperture is represented by an F # value.

An F-number F # is a relative value (reciprocal of a relative aperture) obtained by dividing a focal length of a lens by a diameter of a clear aperture of the lens. A smaller value of the F-number F # indicates a larger amount of light that enters in same unit time, a smaller depth of field, and blurring of photographed background content, to generate effect similar to that of a long-focus lens.

Focal power represents a refraction capability of a lens on an incident parallel light beam.

Positive focal power represents that a lens has a positive focal length and has effect of converging light.

Negative focal power represents that a lens has a negative focal length and has effect of diverging light.

Field of view (Field of view, FOV for short): An included angle that uses a lens assembly as a vertex and that is formed by using two edges of a maximum range in which an object image of a photographed object can pass through the lens assembly is referred to as the field of view.

Object side: A lens assembly is used as a boundary, one side on which a photographed object is located is the object side, and one surface that is of a lens and that faces the object side is an object-side surface of the lens.

An image side: A lens assembly is used as a boundary, one side on which an image of a photographed object is located is an image side, and one surface that is of a lens and that faces the image side is an image-side surface of the lens.

A total track length (total track length, TTL for short) is a total length from a vertex of a first lens that is in a lens assembly and that is disposed adjacent to an object side to an imaging plane of the lens assembly, that is, a distance from the first lens to a focal plane of an image sensor.

A total image height (image height, IH for short) is also referred to as an image height, and is a total image height of an image formed by a lens assembly.

A target surface is a photosensitive surface of an image sensor. A larger optical format indicates a larger amount of light sensed by the image sensor and a larger image height of imaging.

An Abbe number is also referred to as a dispersion coefficient, is a difference ratio of refractive indexes of an optical material at different wavelengths, and indicates a dispersion degree of the material.

A refractive index is a ratio of a speed of light in the air to a speed of light in an optical material. A higher refractive index of the optical material indicates a stronger refraction capability of incident light and a thinner lens.

Defocusing means a blurring phenomenon caused by not focusing on a photographed object.

Distortion is also referred to as distortion, and generally means a degree of distortion of an image formed by a lens assembly for an object relative to the object itself. A height of a point at which chief rays of different fields of view intersect with a Gaussian image plane after passing through a lens assembly is not equal to an ideal image height, and a difference between the two is distortion.

An embodiment of this application provides an electronic device. The electronic device may include but is not limited to an electronic device having a camera module 101, like a mobile phone, a tablet computer, a notebook computer, an ultra-mobile personal computer (ultra-mobile personal computer, UMPC for short), a handheld computer, an intercom, a netbook, a POS terminal, a personal digital assistant (digital assistant, PDA for short), a wearable device, a virtual reality device, or a vehicle-mounted apparatus.

The following uses an example in which the electronic device is a mobile phone for description.

FIG. 1 is a schematic diagram of a back structure of an electronic device according to an embodiment of this application.

As shown in FIG. 1, an electronic device 100 may include a housing 110 and a camera module 101. The camera module 101 may be disposed on the housing 110, and the camera module 101 may be configured to photograph an image.

The camera module 101 may be disposed on a front surface (one surface having a display screen) of the electronic device 100 for taking a selfie or photographing another object. Alternatively, the camera module 101 may be disposed on a back surface (one surface faces away from the display screen) of the electronic device 100 for photographing another object. Certainly, the camera module 101 may also be configured to take a selfie.

In this embodiment of this application, a direction in which the back surface of the electronic device 100 points to the front surface of the electronic device 100 is a thickness direction of the electronic device 100 (for example, a direction z in FIG. 1).

It should be noted that the electronic device 100 may further include another structural part. For example, as shown in FIG. 1, the housing 110 of the electronic device 100 may be provided with speaker holes 120 for playing a sound. The housing 110 may further be provided with a data interface 130 that is configured to be connected to a data line.

Alternatively, in some other examples, the electronic device 100 may further include another structural part that can enable the electronic device 100 to completely implement functions of the electronic device 100, like a sensor, a processor, or a circuit board. This is not limited in embodiments of this application.

For example, the camera module 101 is located on the back surface of the electronic device 100. The camera module 101 may include a lens cover 20 and a lens assembly (not shown in the figure). The lens assembly may include a plurality of lenses that are sequentially arranged from an object side to an image side along an optical axis. A sequential arrangement direction of the lenses may be the same as a thickness direction of the housing 110 of the electronic device 100.

The housing 110 may include a middle frame 112 and a rear cover 111 that covers the middle frame 112. The lens cover 20 may be located on the rear cover 111. The lens assembly 10 may be disposed on the middle frame 112. The lens cover 20 may be located on one side that is of the lens assembly and that faces away from the display screen, that is, the lens cover 20 is located on one side that is of the lens assembly and that faces the object side.

It should be understood that there may be one camera module 101 disposed on the front surface or the back surface of the electronic device 100, as shown in FIG. 1. Alternatively, there may be a plurality of camera modules 101.

For example, in some examples, the plurality of camera modules 101 may be disposed on the back surface of the electronic device 100 to enrich a photographing function to improve photographing quality. Each camera module includes one lens assembly, and a plurality of lens assemblies may share one lens cover 20. In other words, the lens cover 20 is located on one side that is of the plurality of lens assemblies and that faces the object side, and one lens cover 20 may cover the plurality of lens assemblies.

Performance of the lens assembly greatly affects imaging quality and imaging effect. An F-number value is one key indicator of the lens assembly. An F-number directly affects core functions of a camera, such as night scene photographing, video shooting, background blurring, and snapshot. Moreover, when a lens assembly with a wide aperture (a smaller F-number) is used for photographing, a blurring background of an image may be increased to highlight a photographed subject. Therefore, a shutter speed and a focusing speed may be improved, and good imaging quality and effect are achieved.

In addition, an optical format is also one of key factors that affect the imaging quality. A larger optical format indicates a larger amount of sensed light, and a larger image height indicates better imaging quality. Therefore, to obtain better imaging quality, a size and a pixel of a photosensitive surface may be increased, to increase the amount of sensed light. Moreover, the wide aperture and the large optical format are considered, so that brightness and resolution of imaging are also greatly improved. Therefore, imaging with the wide aperture and the large optical format becomes one of important development trends of the lens assembly in the electronic device like a mobile phone.

However, to implement a requirement, of the lens assembly, in which the wide aperture and the large optical format are considered, so as to obtain high imaging quality, a manner of increasing a quantity of optical elements such as lenses in the lens assembly is usually used to provide a higher degree of design freedom. Due to a limitation of a processing size of the optical element, increasing the quantity of optical elements causes an increase in a total track length TTL of the entire camera module. In this way, occupied space required by the camera module in the thickness direction of the electronic device 100 is large. This is not conducive to a thinning design of the electronic device 100.

Based on this, an embodiment of this application provides an electronic device. A lens assembly of a camera module of the electronic device has characteristics of a wide aperture and a large optical format, and a thickness of the electronic device can be reduced, so that a thinning requirement of the electronic device is met.

Figure 2:
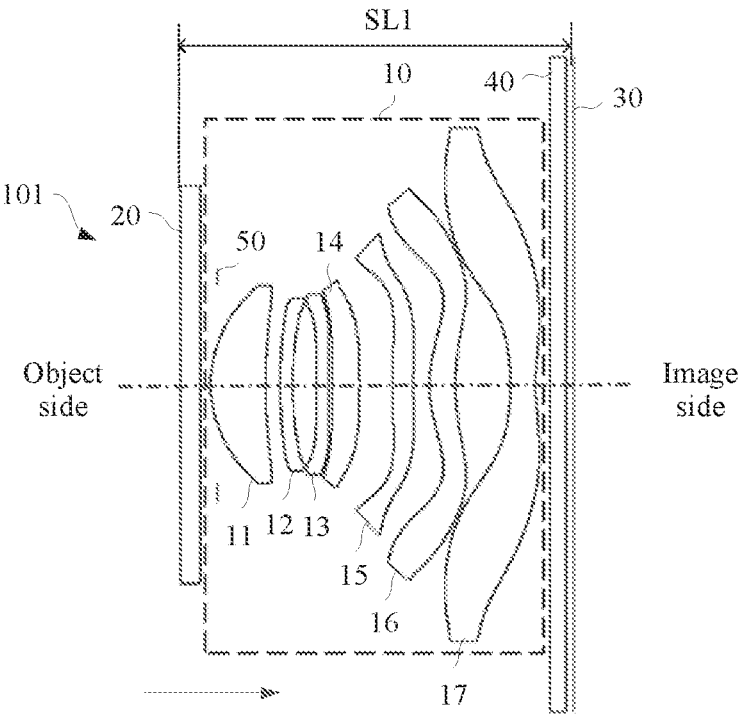
FIG. 2 is a schematic diagram of a structure of a camera module of an electronic device in a first state according to an embodiment of this application.
Figure 3:
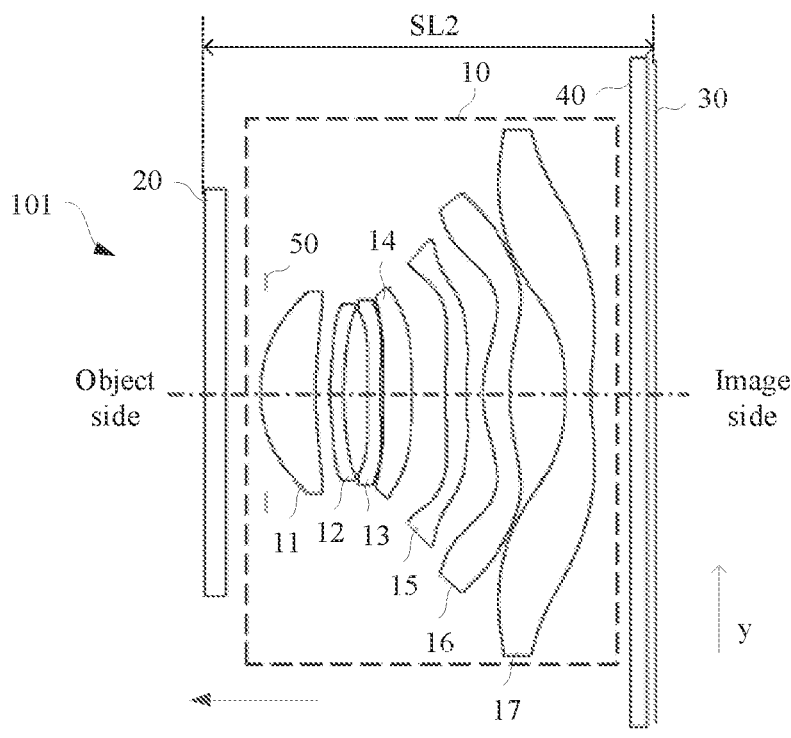
FIG. 3 is a schematic diagram of a structure of a camera module of an electronic device in a second state according to an embodiment of this application.

FIG. 2 is a schematic diagram of a structure of a camera module of an electronic device in a first state according to an embodiment of this application. FIG. 3 is a schematic diagram of a structure of a camera module of an electronic device in a second state according to an embodiment of this application.

As shown in FIG. 2, the camera module 101 of the electronic device 100 includes a lens cover 20 and a lens assembly 10. The camera module 101 may further include an image sensor 30. The image sensor 30 may convert, by using an optical-to-electrical conversion function of an optoelectronic device, an optical image on a photosensitive surface into an electrical signal that is in a corresponding proportion to the optical image, to implement imaging.

The image sensor 30 may be located on one side that is of the lens assembly 10 and that faces an image side. In other words, the lens assembly 10 may be located between the lens cover 20 and the image sensor 30. The photosensitive surface of the image sensor 30 faces the lens assembly 10. Light enters the camera module 101 of the electronic device 100 from the lens cover 20, passes through the lens assembly 10, and then is irradiated on the photosensitive surface of the image sensor 30 to be received by the image sensor 30.

The image sensor 30 may be a charge-coupled device (charge-coupled device, CCD for short), or may be a complementary metal oxide semiconductor (complementary metal oxide semiconductor, CMOS for short). Alternatively, the image sensor 30 may be another device that can implement the optical-to-electrical conversion function.

The camera module 101 may further include a light filter 40. The light filter 40 may be located between the lens assembly 10 and the image sensor 30. The light filter 40 may enable light within a specific wavelength range to pass through, to perform light filtering. Light entering from the lens cover 20 sequentially passes through the lens assembly 10 and the light filter 40, and then is irradiated on the image sensor 30. The light filter 40 may filter out stray light that is not conducive to imaging, to improve imaging quality.

The camera module 101 may further include a stop 50. The stop 50 may implement a function of adjusting light intensity, to improve definition, brightness, and the like of imaging and improve the imaging quality. The stop 50 may be located between the lens cover 20 and the lens assembly 10, or the stop 50 may be located between two adjacent lenses in the lens assembly 10.

For example, the stop 50 is located between the lens cover 20 and the lens assembly 10. As shown in FIG. 2, a dashed line in FIG. 2 is an optical axis of the lens assembly 10. Along the optical axis, the lens cover 20, the stop 50, the lens assembly 10, the light filter 40, and the image sensor 30 may be sequentially arranged from an object side to the image side. Light is irradiated into the camera module 101 through the lens cover 20, sequentially passes through the stop 50, the lens assembly 10, and the light filter 40, and is then irradiated on the photosensitive surface of the image sensor 30 to be received by the image sensor 30 for imaging.

The lens assembly 10 includes a plurality of lenses that are sequentially arranged along the optical axis from the object side to the image side, and the plurality of lenses all have focal power. For example, the lens assembly 10 may include a first lens 11, a second lens 12, a third lens 13, . . . , and an $N^{th}$ lens that are sequentially arranged along the optical axis from the object side to the image side, where N may be a positive integer greater than or equal to 3. A lens located at one end that is of the lens assembly 10 and that is close to the object side is the first lens 11. A lens located at one side that is of the first lens 11 and that faces the image side is the second lens 12. The first lens 11 is adjacent to the second lens 12. The rest is deduced by analogy until the $N^{th}$ lens is arranged. A lens located at one end that is of the lens assembly 10 and that is close to the image side is the $N^{th}$ lens.

As shown in FIG. 2, for example, the lens assembly 10 includes seven lenses, that is, N is 7. The first lens 11, the second lens 12, the third lens 13, a fourth lens 14, a fifth lens 15, a sixth lens 16, and a seventh lens 17 are sequentially arranged from the object side to the image side.

The plurality of lenses are sequentially arranged along the optical axis, centers of the plurality of lenses may coincide with each other, and an arrangement direction of the lenses may be consistent with a thickness direction of the electronic device 100.

Specifically, the lens assembly 10 satisfies a conditional expression 0.7<IH/(4*F #)<6, where IH is a total image height of the lens assembly, and F # is an F-number of the lens assembly.

The total image height and the F-number of the lens assembly 10 satisfy the foregoing conditional expression, so that the lens assembly 10 may have a small F-number and a large total image height. A smaller F-number indicates a larger aperture, that is, performance, of the lens assembly 10, in which both a wide aperture and a large optical format are included may be implemented. This improves imaging performance of the lens assembly 10 and improves the imaging quality.

The lens assembly 10 may move along the optical axis. Specifically, the entire lens assembly 10 may move along the optical axis. In this way, a distance between the entire lens assembly 10 and the image sensor 30 may be adjusted, to change an image distance and implement a focusing function.

Alternatively, one or more lenses in the lens assembly 10 may move along the optical axis. Specifically, at least one lens that is in the lens assembly 10 and that is close to the object side may move along the optical axis, that is, at least the first lens 11 may move along the optical axis. For example, the first lens 11 moves along the optical axis. The movement of the first lens 11 changes a distance between the first lens 11 and the image sensor 30, and can also change an image distance of the lens assembly 10, to implement the focusing function.

It should be noted that there may be one or more movable lenses in the lens assembly 10. For example, both the first lens 11 and the second lens 12 may move along the optical axis. When the plurality of lenses move, the plurality of lenses may move separately, or the plurality of lenses may move together.

To reduce space occupied, in the thickness direction of the electronic device 100, by the lens assembly 10 in which the wide aperture and the large optical format are considered, in this embodiment of this application, the lens cover 20 can also move along the optical axis. As shown in FIG. 2, when the camera module 101 of the electronic device 100 is not used for photographing, the camera module 101 is in the first state, that is, when the camera module 101 is in the first state, the camera module 101 is in a non-working state. In this case, the camera module 101 may not be restricted by imaging requirements such as a total track length. The lens cover 20 and the lens assembly 10 may be in a retracted state. That is, the lens cover 20 and the lens assembly 10 may be as close as possible, and the lens assembly 10 and the image sensor 30 (or the light filter 40) may be as close as possible, to reduce space for the entire camera module 101, so as to reduce the space for the camera module 101 in the thickness direction of the electronic device 100. This helps a thinning design of the electronic device 100.

When the electronic device 100 needs to be used to perform a photographing operation, the lens cover 20 may move along the optical axis and extend out of the housing 110. As shown in FIG. 3, the camera module 101 is in the second state. To be specific, when the camera module 101 is in the second state, the camera module 101 is in a working state, and the lens cover 20 is in an extended state. Because the lens cover 20 moves and extends out of the housing 110, avoidance space is formed between the lens cover 20 and the image sensor 30 (or the light filter 40), and the entire lens assembly 10 or the at least one lens that is in the lens assembly 10 and that is close to the object side can move in the avoidance space along the optical axis, so that it is ensured that, when the camera module 101 performs imaging from an infinite distance to a near object distance, the lens assembly 10 has a long enough focusing movement distance, the total track length TTL required for imaging of the lens assembly 10 in which the wide aperture and the large optical format are considered is met, the focusing function is implemented, and the imaging quality is ensured.

That is, when the electronic device 100 needs to be used to perform the photographing operation, the lens cover 20 may move along the optical axis and extend out of the housing 110, so that the camera module 101 is in the second state. The movement of the lens cover 20 leaves the avoidance space. The entire lens assembly 10 or the at least one lens that is in the lens assembly 10 and that is close to the object side may move along the optical axis in the avoidance space, to implement the focusing function and improve the imaging quality.

After the photographing is completed, the entire lens assembly 10 or the at least one lens that is in the lens assembly 10 and that is close to the object side may move toward the image sensor 30 along the optical axis, and the lens cover 20 may retract toward the inside of the housing 110 along the optical axis, so that the camera module 101 is in the first state. In this case, a distance between the lens cover 20 and the lens assembly 10 and a distance between the lens assembly 10 and the image sensor 30 may not be restricted by the imaging requirements such as the total track length, and the distances may be relatively small. In this way, a size of the entire camera module 101 is reduced, so that the space for the camera module 101 in the thickness direction of the electronic device 100 is reduced, and a thinning design requirement of the electronic device 100 is met.

That is, in this embodiment of this application, the lens assembly 10 of the electronic device 100 satisfies a conditional expression 0.7<IH/(4*F #)<6, so that the lens assembly 10 has a characteristic in which both the wide aperture and the large optical format are considered. In addition, when the camera module 101 of the electronic device 100 is in use, the lens cover 20 extends out of the housing 110 and forms the avoidance space, and the entire lens assembly 10 or the at least one lens that is in the lens assembly 10 and that is close to the object side moves along the optical axis, to implement focusing and meet a high-quality imaging requirement. Moreover, when the camera module 101 of the electronic device 100 is not used, the lens assembly 10 and the lens cover 20 move and retract along the optical axis, to reduce the distance between the lens cover 20 and the lens assembly 10 and the distance between the lens assembly 10 and the image sensor 30, and reduce the size of the camera module 101 in the thickness direction. That is, while the high-quality imaging requirement in which the wide aperture and the large optical format are considered is implemented, space for the camera module 101 in the thickness direction when the camera module 101 is in the non-working state is effectively reduced. This helps the thinning design of the electronic device 100.

The lens assembly 10 has performance of the large optical format and the wide aperture. The camera module 101 including the lens assembly 10 may be used as a primary camera of the electronic device 100, so that a performance requirement of the primary camera can be met.

Specifically, in this embodiment of this application, a retraction/extension ratio of the lens cover 20 may be less than 0.95. The retraction/extension ratio of the lens cover 20 is a ratio of a distance SL1 (as shown in FIG. 2) between an object-side surface of the lens cover 20 and the photosensitive surface of the image sensor 30 when the lens cover 20 and the lens assembly 10 are in the retracted state, that is, when the camera module 101 is in the first state, to a distance SL2 (as shown in FIG. 3) between the object-side surface of the lens cover 20 and the photosensitive surface of the image sensor 30 when the lens cover 20 extends out of the housing 110, that is, when the camera module 101 is in the second state. In other words, the retraction/extension ratio of the lens cover 20 satisfies SL=SL1/SL2, and the retraction/extension ratio SL is less than 0.95. The lens cover 20 has good retraction effect. This helps further reduce a length size of the camera module 101 when the lens cover 20 and the lens assembly 10 are in the retracted state, and further helps thinning of the electronic device 100.

It should be noted that, when the camera module 101 of the electronic device 100 is in the non-working state (the first state), the lens cover 20 and the lens assembly 10 are in the retracted state. In this case, the lens cover 20 and a rear cover 111 of the electronic device 100 may be located in a same plane, or the lens cover 20 may be higher than or lower than a plane on which the rear cover 111 is located.

To implement movement of the lens assembly 10 and the lens cover 20 along the optical axis, the electronic device 100 may further include a cover driving apparatus (not shown in the figure) and a lens driving apparatus (not shown in the figure). The cover driving apparatus is configured to drive the lens cover 20 to move along the optical axis. The lens driving apparatus is configured to drive the entire lens assembly 10 to move along the optical axis, or the lens driving apparatus is configured to drive the at least one lens that is in the lens assembly 10 and that is close to the object side to move along the optical axis.

The cover driving apparatus and the lens driving apparatus are two relatively independent driving apparatuses. In other words, the lens assembly 10 and the lens cover 20 are respectively driven by two driving apparatuses, to implement decoupling between movement driving of the lens cover 20 and movement driving of the lens assembly 10. Compared with implementing the movement driving of the lens cover 20 and the lens assembly 10 by a same driving apparatus in the conventional technology, the lens cover 20 and the lens assembly 10 are separately controlled to move along the optical axis in a decoupling manner. This can effectively reduce a precision requirement of the movement driving, helps improve movement accuracy, and facilitates implementation of control.

The cover driving apparatus may be disposed on the housing 110, or the cover driving apparatus may be disposed on another structural part in the electronic device 100. The cover driving apparatus may be a drive structure having a telescopic structure (for example, a memory alloy or a spring). A specific structure composition is not limited in embodiments of this application, provided that the cover can be driven to extend out of the housing 110 along the optical axis or retract toward the housing 110.

Correspondingly, the lens driving apparatus may also be disposed on the housing 110, or the lens driving apparatus may be disposed on another structural part in the electronic device 100. The lens driving apparatus may be a drive motor, for example, a focus motor, a stepper motor, or a voice coil motor. A specific structure is not limited in embodiments of this application, provided that the entire lens assembly 10 or the at least one lens that is in the lens assembly 10 and that is close to the object side can be driven to move along the optical axis.

The electronic device 100 may further include a locking apparatus (not shown in the figure). The locking apparatus is configured to limit a moving location of the lens cover 20. For example, the locking apparatus may limit a location of the lens cover 20 when the camera module 101 is in the second state, and the lens cover 20 extends out of the housing 110. Alternatively, the locking apparatus may further limit a location of the lens cover 20 when the camera module 101 is in the first state, and the lens cover 20 and the lens assembly 10 are in the retracted state.

The locking apparatus may cooperate with the lens driving apparatus. For example, the locking apparatus may be a blocking plate that cooperates with the telescopic structure of the lens driving apparatus to implement limiting. A specific structure of the locking apparatus may be a limiting component like a blocker or the blocking plate, or may be another structural assembly that can have a limiting function. This is not limited in embodiments of this application, provided that the lens cover 20 can be limited.

In addition, there may be two or more cover driving apparatuses, and the two or more cover driving apparatuses may be symmetrically disposed, to improve balance of a driving force for the lens cover 20 and ensure precise displacement of the lens cover 20.

There may be two or more locking apparatuses, to ensure limiting strength of the locking apparatuses on the moving location of the lens cover 20, and further improve the movement accuracy of the lens cover 20. The cover driving apparatuses and the locking apparatuses may be arranged in a spaced manner.

In this embodiment of this application, an equivalent focal length of the lens assembly 10 may be 18 mm to 30 mm, and the equivalent focal length is relatively small. In this way, the lens assembly 10 has a better light convergence capability. This helps improve definition and brightness of imaging and improve the imaging quality.

There may be at least five lenses of the lens assembly 10, that is, the lens assembly 10 includes at least the first lens 11, the second lens 12, the third lens 13, the fourth lens 14, and the fifth lens 15 that are sequentially arranged from the object side to the image side. This can provide a higher degree of freedom for a design of the lens assembly 10, and help improve performance of the lens assembly 10.

Certainly, in some other examples, the lens assembly 10 may further include another quantity of lenses. Specifically, the quantity may be selected and set according to an actual requirement.

An Abbe number of the first lens 11 and an Abbe number of the second lens 12 may satisfy a conditional expression: |vd1−vd2|>60. In other words, the Abbe number of the first lens 11 greatly differs from the Abbe number of the second lens 12. The first lens 11 may be a lens with a high Abbe number, and the second lens 12 may be a lens with a low Abbe number, so that complementary balance can be performed between the first lens 11 and the second lens 12 in terms of a dispersion capability. This reduces an imaging chromatic aberration and further improves the imaging quality.

A total focal length f of the lens assembly 10 is a system focal length of a lens system formed by the N lenses, and the total focal length of the lens assembly 10 is related to a focal length of each lens. For example, a focal length of the first lens 11 and the total focal length of the lens assembly 10 may satisfy a conditional expression: 0.5≤|f1/f|≤1.4, where f1 is the focal length of the first lens 11, and f is the total focal length of the lens assembly 10. This helps improve the imaging chromatic aberration of the lens assembly 10, and further helps improve the imaging quality of the lens assembly 10.

The first lens 11 and the second lens 12 may satisfy a conditional expression: 10<CT1(R3+R4)/(R3−R4)<40, where CT1 is a thickness of a part that is of the first lens 11 and that corresponds to the optical axis. R3 is a curvature radius of an object-side surface of the second lens 12, and R4 is a curvature radius of an image-side surface of the second lens 12. In this way, shapes and locations of the first lens 11 and the second lens 12 may be allocated more properly, to facilitate processing and implementation of the first lens 11 and the second lens 12.

Specifically, there may be 5 to 10 lenses of the lens assembly 10. While a high degree of design freedom is provided for the lens assembly 10, a size of the lens assembly 10 can also be reduced. This helps the thinning design of the electronic device 100 and facilitates production and implementation.

Table 1 shows optical parameters of lens assemblies having different quantities of lenses in an electronic device according to an embodiment of this application.

It can be learned from Table 1 that, when there are 5 to 10 lenses included in the lens assembly 10, the total image height and the F-number of the lens assembly 10 can satisfy a conditional expression: 0.7<IH/(4*F #)<6, so that the lens assembly 10 can have a wider aperture and a larger optical format, to implement a design in which the wide aperture and the large optical format are considered and improve the image quality. At the same time, a design of the first lens 11 and the second lens 12 can better improve an aberration, to further improve the image quality.

All the N lenses of the lens assembly 10 may be aspheric lenses. The aspheric lens means that a curved surface of the lens is not of a same curvature, and is formed by a plurality of curved surfaces. The aspheric lens may have good compensation effect on a spherical aberration and a distortion aberration, and can further help implement performance of the wide aperture of the lens assembly 10.

The lens may be made of plastic, or the lens may be made of glass. For example, all the N lenses in the lens assembly 10 may be plastic lenses, or all the N lenses may be glass lenses, or some of the N lenses may be plastic lenses, and some of the N lenses may be glass lenses.

In this embodiment of this application, the lens assembly 10 can further rotate. Specifically, the lens assembly 10 can rotate around a first axis by using a first central point as a rotation center. The first central point coincides with a center of the image sensor 30. The first axis passes through the first central point and is parallel to the photosensitive surface of the image sensor 30.

In this way, the lens assembly 10 can rotate around the first axis relative to the image sensor 30, and functions of the lens assembly 10 are enriched, so that the camera module 101 is applicable to more photographing scenarios and photographing requirements, and photographing diversity and functional requirements of the electronic device 100 are met.

A rotation angle of the lens assembly 10 around the first axis is +10 degrees to −10 degrees. For example, when the optical axis of the lens assembly 10 is perpendicular to the photosensitive surface of the image sensor 30, the rotation angle of the lens assembly 10 is 0 degrees. When the lens assembly 10 rotates around the first axis clockwise by 10 degrees relative to the image sensor 30, the rotation angle is +10 degrees. When the lens assembly 10 rotates around the

| Quantity of lenses | 5 | 6 | 7 | 8 | 9 | 10 |
|---|---|---|---|---|---|---|
| Total focal length f | 8.78 | 8.48 | 8.38 | 8.56 | 9.45 | 9.44 |
| F-number (F#) | 1.75 | 1.64 | 1.69 | 1.55 | 1.55 | 1.55 |
| Total image height IH | 15.60 | 16.00 | 16.33 | 16.33 | 18.00 | 18.00 |
| Field of view FOV | 81.45 | 84.94 | 87.01 | 85.48 | 85.40 | 85.47 |
| Pop-up retraction/ extension ratio | 86.0% | 86.5% | 88.9% | 85.4% | 83.4% | 83.3% |
| Equivalent focal length | 24.35 | 22.94 | 22.20 | 22.67 | 22.71 | 22.68 |
| vd1 | 81.6 | 81.6 | 95.1 | 81.6 | 81.6 | 81.6 |
| vd2 | 19.2 | 19.2 | 19.2 | 20.4 | 20.4 | 20.4 |
| f1 | 9.19 | 9.67 | 9.46 | 11.49 | 12.90 | 13.01 |
| CT1 | 1.49 | 1.43 | 1.36 | 1.39 | 1.52 | 1.52 |
| R3 | 7.49 | 9.09 | 9.45 | 7.20 | 7.06 | 6.69 |
| R4 | 5.96 | 6.99 | 8.02 | 6.21 | 6.13 | 5.83 |
| IH/(4*F#) | 2.22 | 2.44 | 2.41 | 2.63 | 2.91 | 2.91 |
| vd1 − vd2 | 62.4 | 62.4 | 75.9 | 61.2 | 61.2 | 61.2 |
| f1/f | 1.05 | 1.14 | 1.13 | 1.34 | 1.37 | 1.38 |
| CT1(R3 + R4)(R3 − R4) | 13.07 | 11.00 | 16.51 | 18.75 | 21.48 | 22.03 | first axis counterclockwise by 10 degrees relative to the image sensor 30, the rotation angle is −10 degrees.

The rotation angle of the lens assembly 10 is within the foregoing range. This may reduce an increase in a size, occupied by the lens assembly 10 in the thickness direction, caused by rotation of the lens assembly 10, and help reduce the size of the lens assembly 10 while improving photographing function diversity of the lens assembly 10, so that the thinning design requirement of the electronic device 100 is met.

In addition, the lens assembly 10 can further move in a first direction. The first direction is parallel to the photosensitive surface of the image sensor 30, that is, the first direction is perpendicular to the optical axis of the lens assembly 10, for example, a direction y in FIG. 3. For example, the lens assembly 10 can move up and down relative to the image sensor 30 in the first direction, and the functions of the lens assembly 10 can also be enriched, so that the lens assembly 10 is applicable to more photographing scenarios, function requirements for photographing are better met, and the electronic device 1M has better and more abundant photographing functions.

A moving distance of the lens assembly 10 in the first direction may be +1 mm to −1 mm. For example, when the optical axis of the lens assembly 10 passes through the first central point, the moving distance of the lens assembly 10 is 0 mm. When the lens assembly 10 moves upward by 1 mm in the first direction, the moving distance of the lens assembly 10 is +1 mm. When the lens assembly 10 moves downward by 1 mm in the first direction, the moving distance of the lens assembly 10 is −1 mm.

The moving distance of the lens assembly 10 is within the foregoing range, so that impact on the imaging quality caused by an excessively large moving distance may be reduced or avoided, and good imaging quality is ensured while a multi-scenario photographing requirement is met.

In this embodiment of this application, shake compensation in a photographing process may be implemented by moving the lens assembly 10, to provide a photographing anti-shake function for the electronic device 1X).

The movement of the lens assembly 10 may be driven by the lens driving apparatus, or an anti-shake drive motor may be additionally disposed in the electronic device 100. The anti-shake drive motor drives the lens assembly 10 to move, so that shake displacement compensation is performed when a shake occurs in the photographing process, to implement anti-shake effect.

Alternatively, shake compensation in the photographing process may be implemented by moving the image sensor 30.

For example, a sensor driving apparatus may be disposed in the electronic device 100, and the sensor driving apparatus drives the image sensor 30 to move, so that shake displacement compensation is implemented when the shake occurs in the photographing process, to achieve the anti-shake effect.

The following describes lenses of a lens assembly and performance parameters provided in this application with reference to specific embodiments.

Embodiment 1

Figure 4:
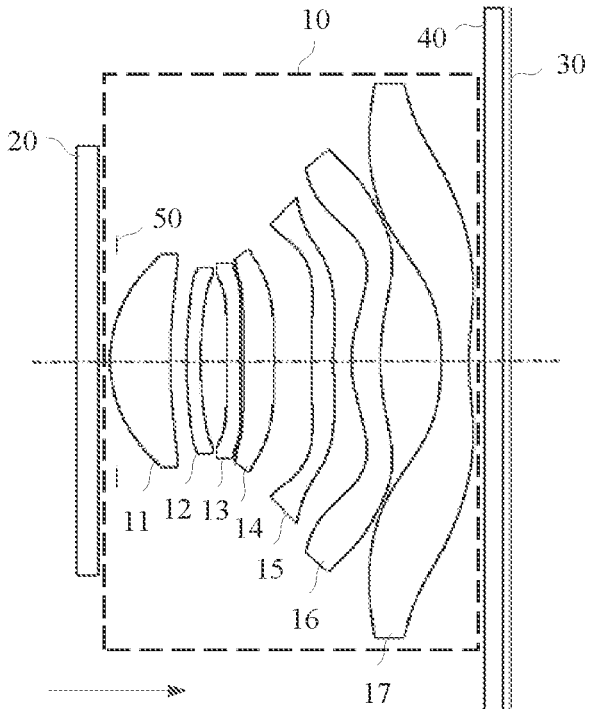
FIG. 4 is a schematic diagram of a simulation structure when a camera module of an electronic device is in a first state according to Embodiment 1 of this application.
Figure 5:
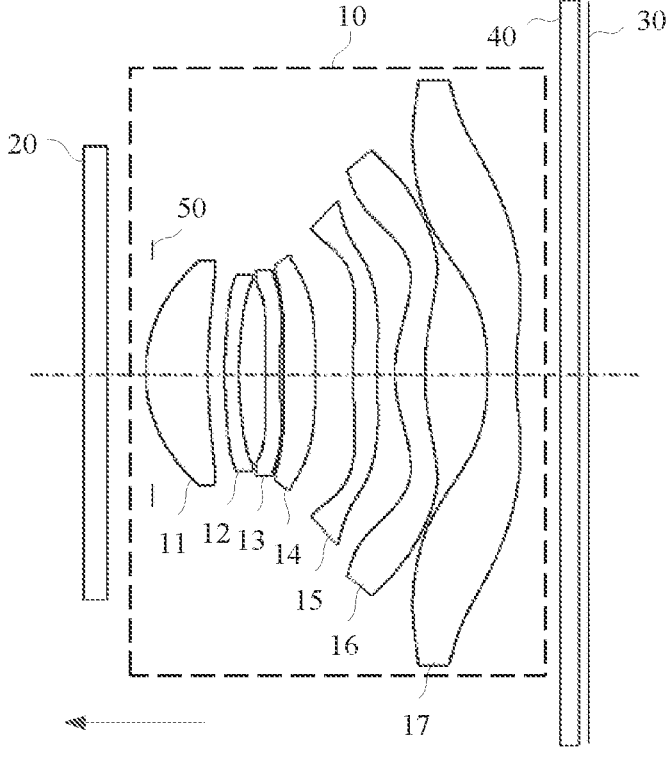
FIG. 5 is a schematic diagram of a simulation structure when a camera module of an electronic device is in a second state according to Embodiment 1 of this application.

FIG. 4 is a schematic diagram of a simulation structure when a camera module of an electronic device is in a first state according to Embodiment 1 of this application. FIG. 5 is a schematic diagram of a simulation structure when a camera module of an electronic device is in a second state according to Embodiment 1 of this application.

In this embodiment, as shown in FIG. 4, a lens assembly 10 includes seven lenses. The lens assembly 10 includes a first lens 11, a second lens 12, a third lens 13, a fourth lens 14, a fifth lens 15, a sixth lens 16, and a seventh lens 17 that are sequentially stacked from an object side to an image side along an optical axis (a dashed line in the figure).

A lens cover 20 is located on one side that is of the first lens 11 and that faces the object side. An image sensor 30 is located on one side that is of the seventh lens 17 and that faces the image side. When the lens cover 20 and the lens assembly 10 retract toward the image side, as shown in FIG. 4, and the camera module 101 of the electronic device 100 is in the first state (a non-working state), the lens cover 20 and the lens assembly 10 are in a retracted state, and a distance between the lens cover 20 and the lens assembly 10 and a distance between the lens assembly 10 and the image sensor 30 are small.

When the lens cover 20 moves toward the object side and extends out of a housing 110, and the camera module 101 of the electronic device 100 is in the second state (a working state), as shown in FIG. 5, avoidance space is left between the lens cover 20 and the image sensor 30, and the lens assembly 10 may move along the optical axis in the avoidance space, to implement a focusing function and ensure imaging quality.

A retraction/extension ratio SL1/SL2 of the lens cover 20 is equal to 0.889. During photographing, a distance range d from an object-side surface of the lens cover 20 to a photographed object is greater than 130 mm.

The first lens 11 has positive focal power. A part that is of an object-side surface of the first lens 11 and that corresponds to the optical axis is a convex surface, and a part that is of an image-side surface of the first lens 11 and that corresponds to the optical axis is a concave surface.

A focal length f1 of the first lens 11 is equal to 9.46, a total focal length f of the lens assembly 10 is equal to 8.38, and a ratio of the focal length f1 of the first lens 11 to the total focal length f of the lens assembly 10 may satisfy: f1/f1=1.129.

The second lens 12 has negative focal power. A part that is of an object-side surface of the second lens 12 and that corresponds to the optical axis is a convex surface, and a part that is of an image-side surface of the second lens 12 and that corresponds to the optical axis is a concave surface. A ratio of a focal length f2 of the second lens 12 to the total focal length f of the lens assembly 10 may satisfy: f2/f1=10.18.

An Abbe number vd1 of the first lens 11 is equal to 95.1, an Abbe number vd2 of the second lens 12 is equal to 19.2, and the Abbe number vd1 of the first lens 11 and the Abbe number vd2 of the second lens 12 satisfy: vd1−vd2=75.9>60.

A thickness CT1 of a part that is of the first lens 11 and that corresponds to the optical axis is equal to 1.36, a curvature radius R3 of the object-side surface of the second lens 12 is equal to 9.45, a curvature radius R4 of the image-side surface of the second lens 12 is equal to 8.02, and the first lens 11 and the second lens 12 satisfy: 10<CT1(R3+R4)/(R3−R4)=16.51<40.

The third lens 13 has negative focal power. A part that is of an object-side surface of the third lens 13 and that corresponds to the optical axis is a convex surface, and a part that is of an image-side surface of the third lens 13 and that corresponds to the optical axis is a concave surface. A ratio of a focal length f3 of the third lens 13 to the total focal length f of the lens assembly 10 may satisfy: |f3/f|=3.824.

The fourth lens 14 has positive focal power. A part that is of an object-side surface of the fourth lens 14 and that corresponds to the optical axis is a convex surface, and a part that is of an image-side surface of the fourth lens 14 and that corresponds to the optical axis is a convex surface. A ratio of a focal length f4 of the fourth lens 14 to the total focal length f of the lens assembly 10 may satisfy: |f4/f|=3.191.

The fifth lens 15 has negative focal power. A part that is of an object-side surface of the fifth lens 15 and that corresponds to the optical axis is a convex surface, and a part that is of an image-side surface of the fifth lens 15 and that corresponds to the optical axis is a concave surface. A ratio of a focal length f5 of the fifth lens 15 to the total focal length f of the lens assembly 10 may satisfy: | f5/f|=4.137.

The sixth lens 16 has positive focal power. A part that is of an object-side surface of the sixth lens 16 and that corresponds to the optical axis is a convex surface, and a part that is of an image-side surface of the sixth lens 16 and that corresponds to the optical axis is a concave surface. A ratio of a focal length f6 of the sixth lens 16 to the total focal length f of the lens assembly 10 may satisfy: |f6/f|=1.008.

The seventh lens 17 has negative focal power. A part that is of an object-side surface of the seventh lens 17 and that corresponds to the optical axis is a concave surface, and a part that is of an image-side surface of the seventh lens 17 and that corresponds to the optical axis is a concave surface. A ratio of a focal length f7 of the seventh lens 17 to the total focal length f of the lens assembly 10 may satisfy: |f7/f|=0.722.

Table 2 shows optical parameters of lenses in a camera module of an electronic device according to Embodiment 1 of this application.

optical axis in a direction from the object side to the image side. For example, a thickness corresponds to S1 in the first state or the second state indicates a distance between an object-side surface of an optical element (for example, the lens cover 20, the lens, a stop 50, and the light filter 40) and an image-side surface of the optical element along the optical axis when the camera module 101 of the electronic device 100 is in the first state (that is, the camera module 101 is in a non-working state, and the lens cover 20 and the lens assembly 10 retract) or in the second state (that is, the camera module 101 is in a working state, and the lens cover 20 extends out of the housing 110).

A thickness corresponds to S2 in the first state or the second state indicates a distance, along the optical axis, between the image-side surface of the optical element and a lens surface of an optical element adjacent to the image-side surface when the camera module 101 of the electronic device 100 is in the first state or the second state.

For example, a thickness of an image-side surface S2 of the lens cover 20 in the second state means a distance between the image-side surface of the lens cover 20 and the stop 50 along the optical axis after the lens cover 20 extends out of the housing 110. A thickness of the image-side surface S2 of the lens cover 20 in the first state means a distance between the image-side surface of the lens cover 20 and the stop 50 along the optical axis after the lens cover 20 retracts.

A thickness of the image-side surface S2 of the seventh lens 17 in the second state means a distance between the image-side surface of the seventh lens 17 and the light filter 40 along the optical axis when the camera module 101 is in the working state, and a thickness of the image-side surface S2 of the seventh lens 17 in the first state means a distance

| Lens | Surface number | Curvature radius | Thickness in a second state | Thickness in a first state | Refractive index | Abbe coefficient |
|------|------|------|------|------|------|------|
| | Object plane | Unlimited | Unlimited | Unlimited | | |
| CG | S1 | Unlimited | 0.5000 | 0.5000 | 1.52 | 64.2 |
| | S2 | Unlimited | 1.0000 | 0.4000 | | |
| | Stop | Unlimited | −0.1500 | −0.1500 | | |
| L1 | S1 | 3.1112 | 1.3603 | 1.3603 | 1.44 | 95.1 |
| | S2 | 10.8498 | 0.3709 | 0.3709 | | |
| L2 | S1 | 9.4549 | 0.3150 | 0.3150 | 1.68 | 19.2 |
| | S2 | 8.0154 | 0.5885 | 0.5885 | | |
| L3 | S1 | 191.3411 | 0.3150 | 0.3150 | 1.68 | 19.2 |
| | S2 | 19.4665 | 0.0712 | 0.0712 | | |
| L4 | S1 | 21.6047 | 0.6988 | 0.6988 | 1.54 | 55.7 |
| | S2 | −42.1949 | 0.8303 | 0.8303 | | |
| L5 | S1 | 11.6300 | 0.5111 | 0.5111 | 1.57 | 37.4 |
| | S2 | 7.2035 | 0.4018 | 0.4018 | | |
| L6 | S1 | 2.7857 | 0.6585 | 0.6585 | 1.54 | 55.7 |
| | S2 | 6.6347 | 1.3744 | 1.3744 | | |
| L7 | S1 | −7.7926 | 0.6255 | 0.6255 | 1.55 | 55.9 |
| | S2 | 5.8835 | 0.9806 | 0.3606 | | |
| IR | S1 | Unlimited | 0.4100 | 0.4100 | 1.52 | 64.2 |
| | S2 | Unlimited | 0.1881 | 0.1881 | | |
| | Image plane | Unlimited | 0.0000 | 0.0000 | 1.44 | 95.1 |

CG represents the lens cover 20, L1 is the first lens 11, L2 is the second lens 12. L3 is the third lens 13, 14 is the fourth lens 14, L5 is the fifth lens 15, L6 is the sixth lens 16, L7 is the seventh lens 17, and IR is a light filter 40. S1 represents the object-side surface.

A thickness of a lens surface (for example, an image-side surface or an object-side surface) means a distance between the lens surface and an adjacent next lens surface along the between the image-side surface of the seventh lens 17 and the light filter 40 along the optical axis when the camera module 101 is in the non-working state.

Table 3 shows conic coefficients and aspheric coefficients of lenses of a lens assembly in an electronic device according to Embodiment 1 of this application.

| | | Conic coefficient K | A2 | A4 | A6 | A8 | A10 | A12 | A14 |
|---|---|---|---|---|---|---|---|---|---|
| L1 | S1 | 1.591E−01 | 0.000E+00 | −1.392E−03 | 6.404E−04 | −6.703E−04 | 3.644E−04 | −1.303E−04 | 2.990E−05 |
| | S2 | −3.992E+00 | 0.000E+00 | −2.509E−03 | −8.887E−04 | 1.294E−03 | −1.032E−03 | 4.966E−04 | −1.451E−04 |
| L2 | S1 | 0.000E+00 | 0.000E+00 | −8.771E−03 | 1.990E−03 | −1.510E−03 | −1.028E−03 | 5.923E−03 | −8.486E−03 |
| | S2 | 0.000E+00 | 0.000E+00 | −3.787E−03 | −1.012E−02 | 3.507E−02 | −7.112E−02 | 9.670E−02 | −9.141E−02 |
| L3 | S1 | 0.000E+00 | 0.000E+00 | −1.105E−02 | 3.206E−02 | −8.512E−02 | 1.303E−01 | −1.339E−01 | 9.587E−02 |
| | S2 | 0.000E+00 | 0.000E+00 | −3.148E−02 | 8.445E−02 | −1.699E−01 | 2.194E−01 | −1.974E−01 | 1.279E−01 |
| L4 | S1 | 0.000E+00 | 0.000E+00 | −4.164E−02 | 7.938E−02 | −1.394E−01 | 1.613E−01 | −1.290E−01 | 7.340E−02 |
| | S2 | 0.000E+00 | 0.000E+00 | −1.553E−02 | 7.871E−04 | 3.502E−03 | −6.005E−03 | 4.495E−03 | −1.779E−03 |
| L5 | S1 | 0.000E+00 | 0.000E+00 | −2.698E−02 | 1.190E−02 | 2.202E−02 | −5.644E−03 | 4.839E−03 | −2.391E−03 |
| | S2 | 0.000E+00 | 0.000E+00 | −6.621E−02 | 2.993E−02 | −1.133E−02 | 3.887E−03 | −1.261E−03 | 3.402E−04 |
| L6 | S1 | −1.000E+00 | 0.000E+00 | −3.060E−02 | 1.523E−03 | 9.206E−04 | −4.496E−04 | 1.066E−04 | −1.768E−05 |
| | S2 | 0.000E+00 | 0.000E+00 | 1.659E−02 | −1.450E−02 | 5.091E−03 | −1.218E−03 | 2.059E−04 | −2.538E−05 |
| L7 | S1 | 0.000E+00 | 0.000E+00 | −2.230E−02 | 3.228E−03 | −4.753E−04 | 9.234E−05 | −1.243E−05 | 1.071E−06 |
| | S2 | −1.000E+00 | 0.000E+00 | −2.652E−02 | 4.580E−03 | −7.288E−04 | 9.811E−05 | −1.048E−05 | 8.568E−07 |

| | | A16 | A18 | A20 | A22 | A24 | A26 | A28 | A30 |
|---|---|---|---|---|---|---|---|---|---|
| L1 | S1 | −4.384E−06 | 3.759E−07 | −1.476E−08 | 0.000E+00 | 0.000E+00 | 0.000E+00 | 0.000E+00 | 0.000E+00 |
| | S2 | 2.524E−05 | −2.400E−06 | 9.547E−08 | 0.000E+00 | 0.000E+00 | 0.000E+00 | 0.000E+00 | 0.000E+00 |
| L2 | S1 | 6.963E−03 | −3.740E−03 | 1.374E−03 | −3.485E−04 | 6.012E−05 | −6.737E−06 | 4.425E−07 | −1.292E−08 |
| | S2 | 6.170E−02 | −3.013E−02 | 1.066E−02 | −2.703E−03 | 4.785E−04 | −5.615E−05 | 3.922E−06 | −1.234E−07 |
| L3 | S1 | −4.876E−02 | 1.770E−02 | −4.549E−03 | 8.074E−04 | −9.395E−05 | 6.422E−06 | −1.916E−07 | −4.260E−10 |
| | S2 | −6.078E−02 | 2.136E−02 | −5.540E−03 | 1.047E−03 | −1.403E−04 | 1.264E−05 | −6.887E−07 | 1.717E−08 |
| L4 | S1 | −3.012E−02 | 8.941E−03 | −1.903E−03 | 2.833E−04 | −2.815E−05 | 1.706E−06 | −5.158E−08 | 3.864E−10 |
| | S2 | 2.765E−04 | 7.759E−05 | −5.528E−05 | 1.504E−05 | −2.376E−06 | 2.2728E−07 | −1.223E−08 | 2.852E−10 |
| L5 | S1 | 7.913E−04 | −1.830E−04 | 2.992E−05 | −3.439E−06 | 2.713E−07 | −1.396E−08 | 4.211E−10 | −5.641E−12 |
| | S2 | −6.963E−05 | 1.045E−05 | −1.131E−06 | 8.675E−08 | −4.586E−09 | 1.587E−10 | −3.234E−12 | 2.941E−14 |
| L6 | S1 | 2.170E−06 | −1.923E−07 | 1.201E−08 | −5.196E−10 | 1.519E−11 | −2.860E−13 | 3.132E−15 | −1.515E−17 |
| | S2 | 2.330E−06 | −1.600E−07 | 8.150E−09 | −3.018E−10 | 7.850E−12 | −1.354E−13 | 1.384E−15 | −6.329E−18 |
| L7 | S1 | −6.209E−08 | 2.520E−09 | −7.283E−11 | 1.497E−12 | −2.145E−14 | 2.038E−16 | −1.156E−18 | 2.963E−21 |
| | S2 | −5.260E−08 | 2.390E−09 | −7.929E−11 | 1.888E−12 | −3.131E−14 | 3.431E−161 | −2.230E−18 | 6.513E−21 |

It can be learned from Table 3 that the first lens 11 to the seventh lens 17 include 14 aspheric surfaces in total. Surface types z of the aspheric surfaces of the lenses in the lens assembly 10 may be calculated by using the following aspheric surface formula:

$$z = \frac{cr^2}{1 + \sqrt{1 - (K + 1)c^2 r^2}} + \sum_i \text{Air}^j$$

z is a vector height of the aspheric surface, r is a radial coordinate of the aspheric surface, c is a spherical curvature of a vertex of the aspheric surface, K is the conic coefficient, and Ai represents an $i^{th}$-order aspheric coefficient. The lenses may be simulated based on obtained vector heights of the aspheric surfaces, to finally obtain the camera module 101 shown in FIG. 2 and FIG. 3.

For optical parameters of the camera module 101 formed by the foregoing lenses, refer to Table 4.

Table 4 shows optical parameters of a camera module of an electronic device according to Embodiment 1 of this application.

| Optical parameter | |
|---|---|
| Total focal length f/mm | 8.38 |
| Equivalent focal length f/mm | 22.20 |
| F-number F# | 1.69 |
| Total image height IH/mm | 16.33 |
| Field of view FOV/degree | 87.01 |
| Retraction ratio | 88.9% |

It can be learned from Table 4 that an image height and an F-number of the lens assembly 10 satisfy: 0.7<IH/(4*F #)=2.41<6. The lens assembly 10 provided in Embodiment 1 of this application has characteristics of a wide aperture and a large optical format, and the lens cover 20 has a small retraction ratio, so that a thinning design requirement of the electronic device 100 is met.

Figure 6:
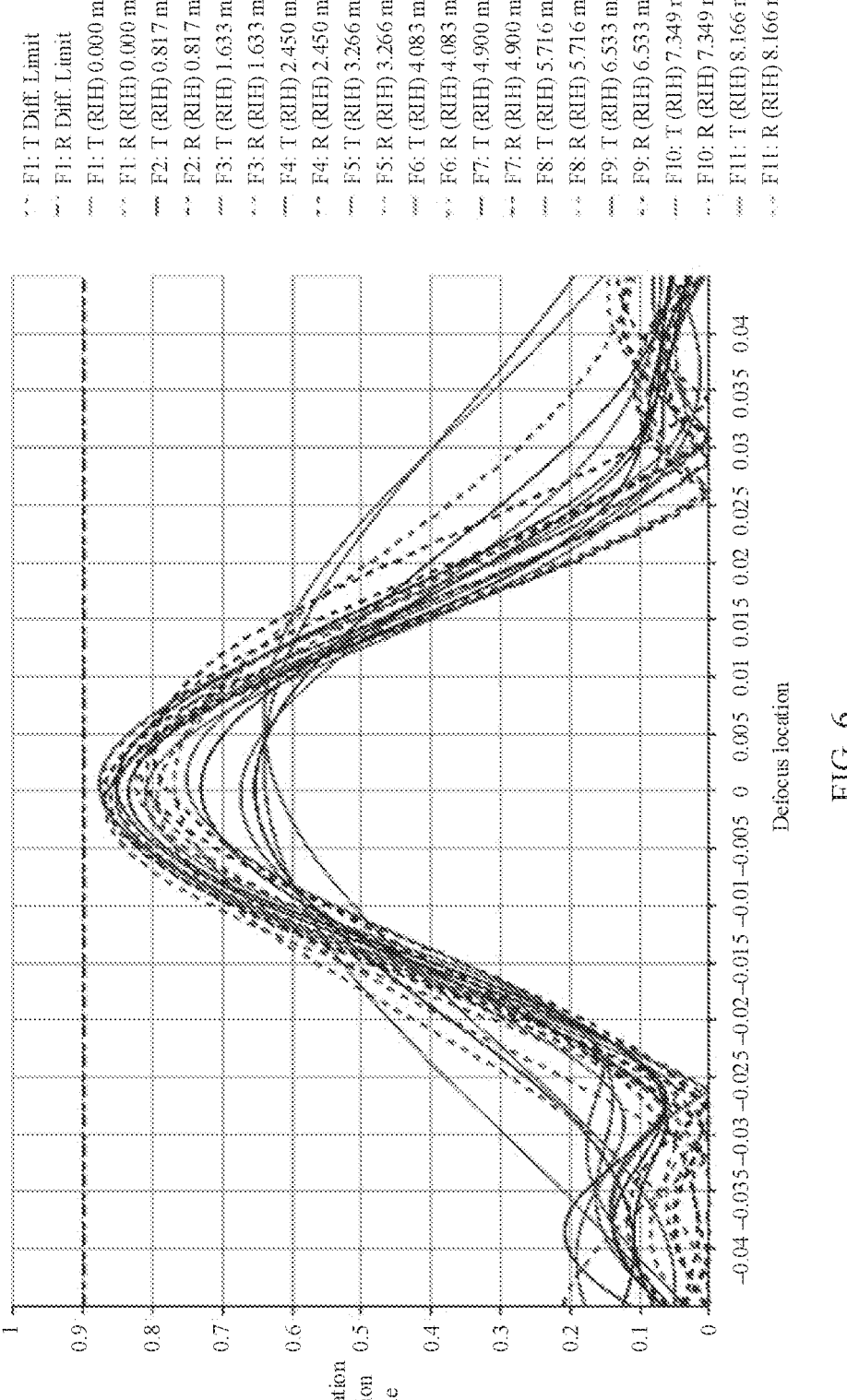
FIG. 6 is a defocus curve diagram of a lens assembly of an electronic device according to Embodiment 1 of this application.

FIG. 6 is a defocus curve diagram of a lens assembly of an electronic device according to Embodiment 1 of this application.

Specifically, FIG. 6 shows a defocus curve of the lens assembly 10 at a spatial frequency of 80 lp/mm. It can be learned from FIG. 6 that modulation transfer function (modulation transfer function, MTF for short) values of the lens assembly 10 in different fields of view are greater than 0.6 in both a sagittal direction and a meridian direction, and field curves of different fields of view are less than 6 μm in both the sagittal direction and the meridian direction, so that the lens assembly 10 has high imaging quality.

Figure 7:
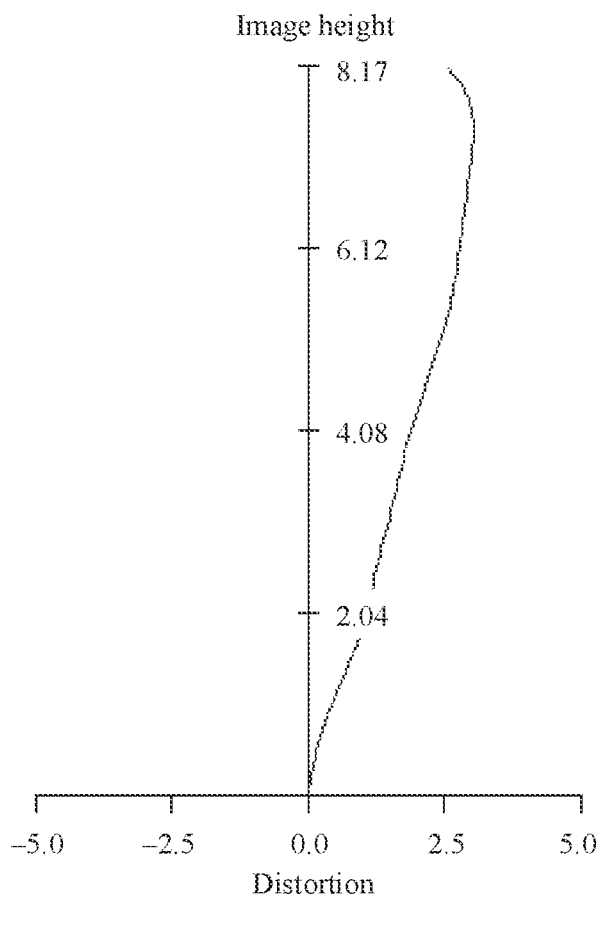
FIG. 7 is a distortion curve diagram of a lens assembly of an electronic device according to Embodiment 1 of this application.

FIG. 7 is a distortion curve diagram of a lens assembly of an electronic device according to Embodiment 1 of this application.

As shown in FIG. 7, optical distortion of the lens assembly 10 is controlled to be within 3%, so that a deformation difference requirement is met, and the imaging quality is high.

Embodiment 2

Figure 8:
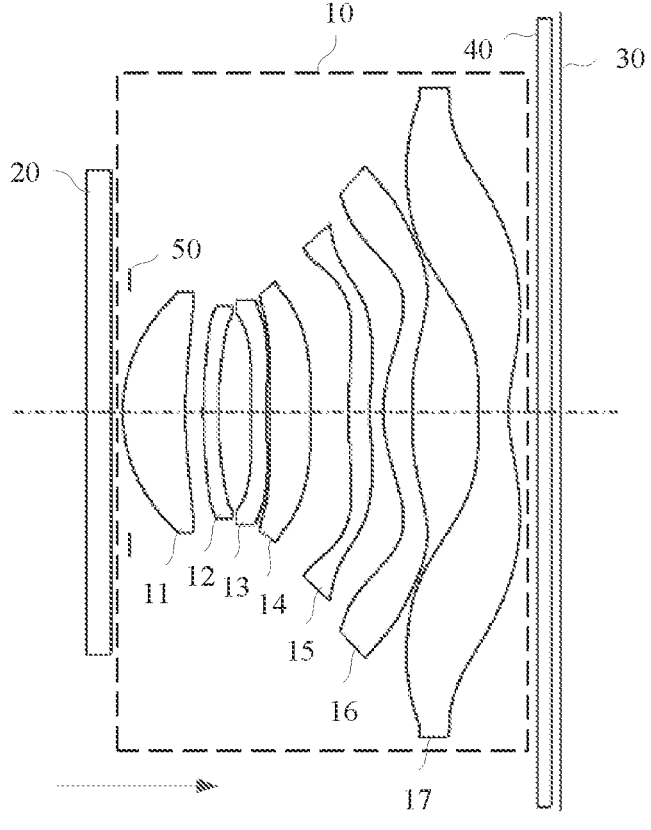
FIG. 8 is a schematic diagram of a simulation structure when a camera module of an electronic device is in a first state according to Embodiment 2 of this application.
Figure 9:
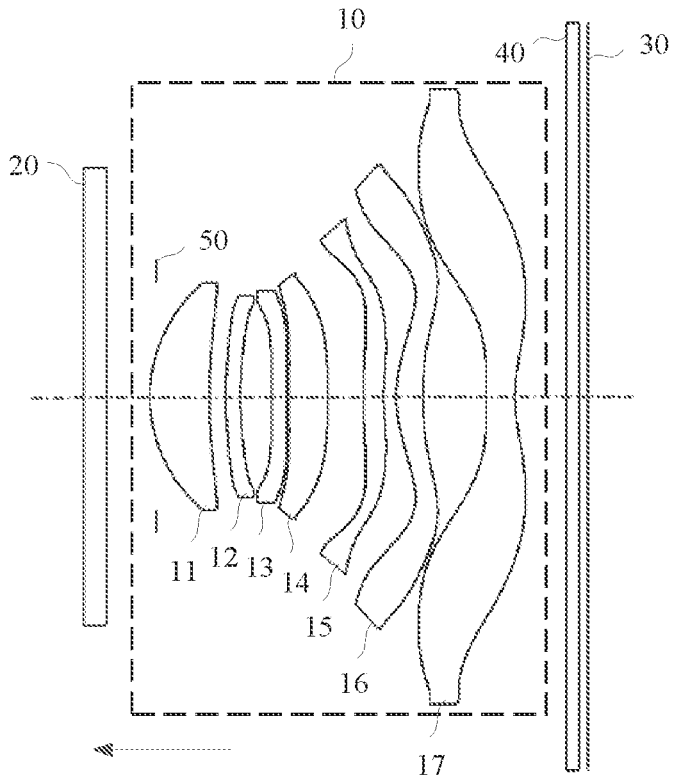
FIG. 9 is a schematic diagram of a simulation structure when a camera module of an electronic device is in a second state according to Embodiment 2 of this application.

FIG. 8 is a schematic diagram of a simulation structure when a camera module of an electronic device is in a first state according to Embodiment 2 of this application. FIG. 9 is a schematic diagram of a simulation structure when a camera module of an electronic device is in a second state according to Embodiment 2 of this application.

In this embodiment, as shown in FIG. 8, a lens assembly 10 includes seven lenses. The lens assembly 10 includes a first lens 11, a second lens 12, a third lens 13, a fourth lens 14, a fifth lens 15, a sixth lens 16, and a seventh lens 17 that are sequentially stacked from an object side to an image side along an optical axis (a dashed line in the figure).

A lens cover 20 is located on one side that is of the first lens 11 and that faces the object side. An image sensor 30 is located on one side that is of the seventh lens 17 and that faces the image side. When the lens cover 20 and the lens assembly 10 retract toward the image side, and the camera module 101 of the electronic device 100 is in the first state (a non-working state), as shown in FIG. 8, the lens cover 20 and the lens assembly 10 are in a retracted state, and a distance between the lens cover 20 and the lens assembly 10 and a distance between the lens assembly 10 and the image sensor 30 are small.

When the lens cover 20 moves toward the object side and extends out of a housing 110, and the camera module 101 of the electronic device 100 is in the second state (a working state), as shown in FIG. 9, avoidance space is left between the lens cover 20 and the image sensor 30, and the lens assembly 10 may move along the optical axis in the avoidance space, to implement focusing.

A retraction/extension ratio SL1/SL2 of the lens cover 20 is equal to 0.889. During photographing, a distance range d from an object-side surface of the lens cover 20 to a photographed object is greater than 120 mm.

The first lens 11 has positive focal power. A part that is of an object-side surface of the first lens 11 and that corresponds to the optical axis is a convex surface, and a part that is of an image-side surface of the first lens 11 and that corresponds to the optical axis is a concave surface.

A focal length f1 of the first lens 11 is equal to 9.94, a total focal length f of the lens assembly 10 is equal to 7.93, and a ratio of the focal length f1 of the first lens 11 to the total focal length f of the lens assembly 10 may satisfy: f1/f=1.2524.

The second lens 12 has negative focal power. A part that is of an object-side surface of the second lens 12 and that corresponds to the optical axis is a convex surface, and a part that is of an image-side surface of the second lens 12 and that corresponds to the optical axis is a concave surface. A ratio of a focal length 12 of the second lens 12 to the total focal length f of the lens assembly 10 may satisfy: f2/f=21.6370.

An Abbe number vd1 of the first lens 11 is equal to 95.1, an Abbe number vd2 of the second lens 12 is equal to 19.2, and the Abbe number vd1 of the first lens 11 and the Abbe number vd2 of the second lens 12 satisfy: vd1−vd2=75.9>60.

A thickness CT1 of a part that is of the first lens 11 and that corresponds to the optical axis is equal to 1.30, a curvature radius R3 of the object-side surface of the second lens 12 is equal to 8.39, a curvature radius R4 of the image-side surface of the second lens 12 is equal to 7.70, and the first lens 11 and the second lens 12 satisfy: 10<CT1(R3+R4)/(R3−R4)=30.64<40.

The third lens 13 has negative focal power. A part that is of an object-side surface of the third lens 13 and that corresponds to the optical axis is a concave surface, and a part that is of an image-side surface of the third lens 13 and that corresponds to the optical axis is a concave surface. A ratio of a focal length 13 of the third lens 13 to the total focal length f of the lens assembly 10 may satisfy: |f3/f|=3.0800.

The fourth lens 14 has positive focal power. A part that is of an object-side surface of the fourth lens 14 and that corresponds to the optical axis is a convex surface, and a part that is of an image-side surface of the fourth lens 14 and that corresponds to the optical axis is a convex surface. A ratio of a focal length f4 of the fourth lens 14 to the total focal length f of the lens assembly 10 may satisfy: |f4/f|=2.7639.

The fifth lens 15 has negative focal power. A part that is of an object-side surface of the fifth lens 15 and that corresponds to the optical axis is a convex surface, and a part that is of an image-side surface of the fifth lens 15 and that corresponds to the optical axis is a concave surface. A ratio of a focal length f5 of the fifth lens 15 to the total focal length f of the lens assembly 10 may satisfy: f5/f=2.344.

The sixth lens 16 has positive focal power. A part that is of an object-side surface of the sixth lens 16 and that corresponds to the optical axis is a convex surface, and a part that is of an image-side surface of the sixth lens 16 and that corresponds to the optical axis is a concave surface. A ratio of a focal length f6 of the sixth lens 16 to the total focal length f of the lens assembly 10 may satisfy: |f6/f|=0.79900.

The seventh lens 17 has negative focal power. Apart that is of an object-side surface of the seventh lens 17 and that corresponds to the optical axis is a concave surface, and a part that is of an image-side surface of the seventh lens 17 and that corresponds to the optical axis is a concave surface. A ratio of a focal length f7 of the seventh lens 17 to the total focal length f of the lens assembly 10 may satisfy: f7/f=0.7404.

Table 5 shows optical parameters of lenses in a camera module of an electronic device according to Embodiment 2 of this application.

| Lens | Surface number | Curvature radius | Thickness in a second state | Thickness in a first state | Refractive index | Abbe coefficient |
|---|---|---|---|---|---|---|
| | Object plane | Unlimited | Unlimited | Unlimited | | |
| CG | S1 | Unlimited | 0.5000 | 0.5000 | 1.52 | 64.2 |
| | S2 | Unlimited | 1.1000 | 0.4000 | | |
| | Stop | Unlimited | −0.1500 | −0.1500 | | |
| L1 | S1 | 3.1848 | 1.3008 | 1.3008 | 1.44 | 95.1 |
| | S2 | 10.4063 | 0.3642 | 0.3642 | | |
| L2 | S1 | 8.3875 | 0.3150 | 0.3150 | 1.68 | 19.2 |
| | S2 | 7.7043 | 0.6878 | 0.6878 | | |
| L3 | S1 | −100.0000 | 0.3150 | 0.3150 | 1.68 | 19.2 |
| | S2 | 19.8464 | 0.0679 | 0.0679 | | |
| L4 | S1 | 26.3079 | 0.8483 | 0.8483 | 1.55 | 55.9 |
| | S2 | −21.6998 | 0.7747 | 0.7747 | | |
| L5 | S1 | 7.3969 | 0.4437 | 0.4437 | 1.57 | 37.4 |
| | S2 | 4.2616 | 0.2779 | 0.2779 | | |
| L6 | S1 | 2.7702 | 0.5946 | 0.5946 | 1.55 | 55.9 |
| | S2 | 13.4752 | 1.3820 | 1.3820 | | |
| L7 | S1 | −262.0062 | 0.6225 | 0.6225 | 1.55 | 55.9 |
| | S2 | 3.2478 | 1.1174 | 0.5974 | | |

-continued

| Lens | Surface number | Curvature radius | Thickness in a second state | Thickness in a first state | Refractive index | Abbe coefficient |
|---|---|---|---|---|---|---|
| IR | S1 | Unlimited | 0.3000 | 0.3000 | 1.52 | 64.2 |
|  | S2 | Unlimited | 0.1881 | 0.1881 |  |  |
|  | Image plane | Unlimited | 0.0000 | 0.0000 |  |  |

CG represents the lens cover 20, L1 is the first lens 11. L2 is the second lens 12. L3 is the third lens 13, 14 is the fourth lens 14, L5 is the fifth lens 15, L6 is the sixth lens 16, L7 is the seventh lens 17, and IR is a light filter 40. S1 represents the object-side surface, and S2 represents the image-side surface.

For a description of a thickness of a lens surface, refer to Embodiment 1. Specifically, a thickness corresponds to S1 in the first state or the second state indicates a distance between an object-side surface of an optical element and an image-side surface of the optical element along the optical axis when the camera module 101 of the electronic device 100 is in the first state or the second state.

A thickness corresponds to S2 in the first state or the second state indicates a distance, along the optical axis, between the image-side surface of the optical element and a lens surface of an optical element adjacent to the image-side surface when the camera module 101 of the electronic device 100) is in the first state or the second state.

Table 6 shows conic coefficients and aspheric coefficients of lenses of a lens assembly in an electronic device according to Embodiment 2 of this application.

|  |  | K | A2 | A4 | A6 | A8 | A10 | A12 | A14 |
|---|---|---|---|---|---|---|---|---|---|
| L1 | S1 | 3.119E−02 | 0.000E+00 | −8.431E−04 | 1.152E−03 | −1.295E−03 | 8.691E−04 | −3.654E−04 | 9.660E−05 |
|  | S2 | −3.087E+00 | 0.000E+00 | −3.072E−03 | −4.844E−04 | 8.547E−04 | −7.419E−04 | 3.811E−04 | −1.175E−04 |
| L2 | S1 | −2.586E−01 | 0.000E+00 | −9.802E−03 | 4.763E−03 | −1.087E−02 | 1.797E−02 | −1.996E−02 | 1.573E−02 |
|  | S2 | −9.493E−02 | 0.000E+00 | −4.054E−03 | −1.004E−02 | 3.220E−02 | −6.134E−02 | 7.885E−02 | −7.117E−02 |
| L3 | S1 | −9.800E+01 | 0.000E+00 | −1.537E−02 | 3.213E−02 | −7.928E−02 | 1.214E−01 | −1.300E−01 | 9.992E−02 |
|  | S2 | 3.482E+00 | 0.000E+00 | −3.463E−02 | 6.877E−02 | −1.123E−01 | 1.219E−01 | −9.399E−02 | 5.268E−02 |
| L4 | S1 | −1.734E+01 | 0.000E+00 | −3.942E−02 | 6.584E−02 | −9.623E−02 | 9.521E−02 | −6.603E−02 | 3.239E−02 |
|  | S2 | 2.902E+00 | 0.000E+00 | −1.807E−02 | 1.071E−02 | −1.454E−02 | 1.575E−02 | −1.309E−02 | 7.969E−03 |
| L5 | S1 | 3.781E−03 | 0.000E+00 | −4.973E−02 | 3.487E−02 | −1.961E−02 | 8.556E−03 | −2.928E−03 | 7.489E−04 |
|  | S2 | −3.910E−03 | 0.000E+00 | −1.027E−01 | 5.102E−02 | −2.172E−02 | 7.953E−03 | −2.471E−03 | 6.089E−04 |
| L6 | S1 | −1.001E+00 | 0.000E+00 | −3.031E−02 | 5.497E−03 | −5.190E−04 | −3.267E−04 | 1.514E−04 | −3.379E−05 |
|  | S2 | −1.784E−01 | 0.000E+00 | 3.381E−02 | −1.428E−02 | 3.792E−03 | −8.480E−04 | 1.507E−04 | −2.039E−05 |
| L7 | S1 | 5.467E+01 | 0.000E+00 | −4.093E−02 | 7.998E−03 | −1.299E−03 | 1.761E−04 | −1.714E−05 | 1.161E−06 |
|  | S2 | −1.001E+00 | 0.000E+00 | −4.642E−02 | 1.053E−02 | −2.068E−03 | 3.163E−04 | −3.625E−05 | 3.062E−06 |

|  |  | A16 | A18 | A20 | A22 | A24 | A26 | A28 | A30 |
|---|---|---|---|---|---|---|---|---|---|
| L1 | S1 | −1.569E−05 | 1.430E−06 | −5.615E−08 | 0.000E+00 | 0.000E+00 | 0.000E+00 | 0.000E+00 | 0.000E+00 |
|  | S2 | 2.129E−05 | −2.071E−06 | 8.253E−08 | 0.000E+00 | 0.000E+00 | 0.000E+00 | 0.000E+00 | 0.000E+00 |
| L2 | S1 | −8.949E−03 | 3.710E−03 | −1.120E−03 | 2.436E−04 | −3.715E−05 | 3.770E−06 | −2.285E−07 | 6.257E−09 |
|  | S2 | 4.633E−02 | −2.203E−02 | 7.658E−03 | −1.923E−03 | 3.393E−04 | −3.991E−05 | 2.807E−06 | −8.930E−08 |
| L3 | S1 | −5.603E−02 | 2.309E−02 | −6.985E−03 | 1.532E−03 | −2.373E−04 | 2.461E−05 | −1.533E−06 | 4.341E−08 |
|  | S2 | −2.171E−02 | 6.626E−03 | −1.501E−03 | 2.508E−04 | −3.034E−05 | 2.537E−06 | −1.325E−07 | 3.274E−09 |
| L4 | S1 | −1.114E−02 | 2.623E−03 | −3.957E−04 | 3.062E−05 | 5.796E−07 | −3.702E−07 | 3.229E−08 | −9.919E−10 |
|  | S2 | −3.499E−03 | 1.107E−03 | −2.521E−04 | 4.082E−05 | −4.578E−06 | 3.375E−07 | −1.470E−08 | 2.860E−10 |
| L5 | S1 | −1.374E−04 | 1.721E−05 | −1.329E−06 | 4.136E−08 | 2.575E−09 | −3.305E−10 | 1.379E−11 | −2.155E−13 |
|  | S2 | −1.138E−04 | 1.576E−05 | −1.589E−06 | 1.144E−07 | −5.706E−09 | 1.870E−10 | −3.618E−12 | 3.131E−14 |
| L6 | S1 | 4.773E−06 | −4.540E−07 | 2.972E−08 | −1.341E−09 | 4.098E−11 | −8.104E−13 | 9.358E−15 | −4.792E−17 |
|  | S2 | 2.066E−06 | −1.546E−07 | 8.428E−09 | −3.286E−10 | 8.889E−12 | −1.579E−13 | 1.653E−15 | −7.702E−18 |
| L7 | S1 | −5.537E−08 | 1.885E−09 | −4.598E−11 | 7.958E−13 | −9.536E−15 | 7.533E−17 | −3.548E−19 | 7.651E−22 |
|  | S2 | −1.892E−07 | 8.530E−09 | −2.789E−10 | 6.525E−12 | −1.063E−13 | 1.146E−15 | −7.337E−18 | 2.114E−20 |

It can be learned from Table 6 that the first lens 11 to the seventh lens 17 include 14 aspheric surfaces in total. Surface types z of the aspheric surfaces of the lenses in the lens assembly 10 may be calculated by using the following aspheric surface formula.

$$z = \frac{cr^2}{1 + \sqrt{1 - (K + 1)c^2 r^2}} + \sum_i \text{Ai} r^i$$

z is a vector height of the aspheric surface, r is a radial coordinate of the aspheric surface, c is a spherical curvature of a vertex of the aspheric surface, K is the conic coefficient, and Ai represents an $i^{th}$-order aspheric coefficient. The lenses may be simulated based on obtained vector heights of the aspheric surfaces, to finally obtain the camera module 101 shown in FIG. 8 and FIG. 9.

For optical parameters of the camera module 101 formed by the foregoing lenses, refer to Table 7.

Table 7 shows optical parameters of a camera module of an electronic device according to Embodiment 2 of this application.

| Optical parameter | |
|---|---|
| Total focal length f/mm | 7.93 |
| Equivalent focal length f/mm | 21.02 |
| F-number F# | 1.59 |
| Total image height IH/mm | 16.33 |
| Field of view FOV/degree | 89.80 |
| Retraction ratio | 88.9% |

It can be learned from Table 7 that an image height and an F-number of the lens assembly 10 satisfy: 0.7<IH/(4*F #)=2.56<6. The lens assembly 10 provided in Embodiment 2 of this application has characteristics of a wide aperture and a large optical format, and the lens cover 20 has a small retraction ratio, so that a thinning design requirement of the electronic device 100 is met.

Figure 10:
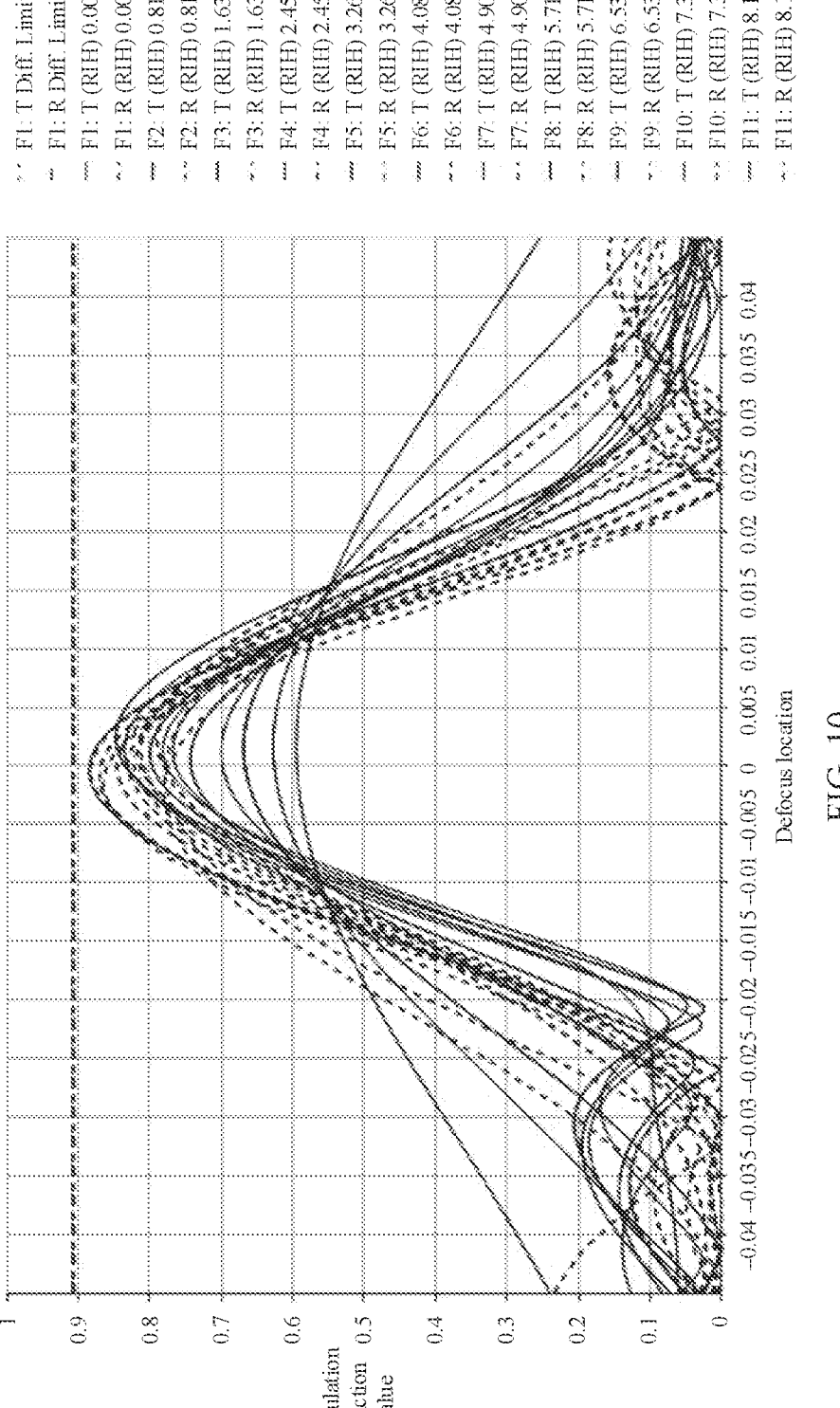
FIG. 10 is a defocus curve diagram of a lens assembly of an electronic device according to Embodiment 2 of this application.

FIG. 10 is a defocus curve diagram of a lens assembly of an electronic device according to Embodiment 2 of this application.

Specifically, FIG. 10 shows a defocus curve of the lens assembly 10 at a spatial frequency of 80 lp/mm. It can be learned from FIG. 10 that modulation transfer function (modulation transfer function, MTF for short) values of the lens assembly 10 in different fields of view are greater than 0.5 in both a sagittal direction and a meridian direction, and field curves of different fields of view are less than 3 μm in both the sagittal direction and the meridian direction, so that the lens assembly 10 has high imaging quality.

Figure 11:
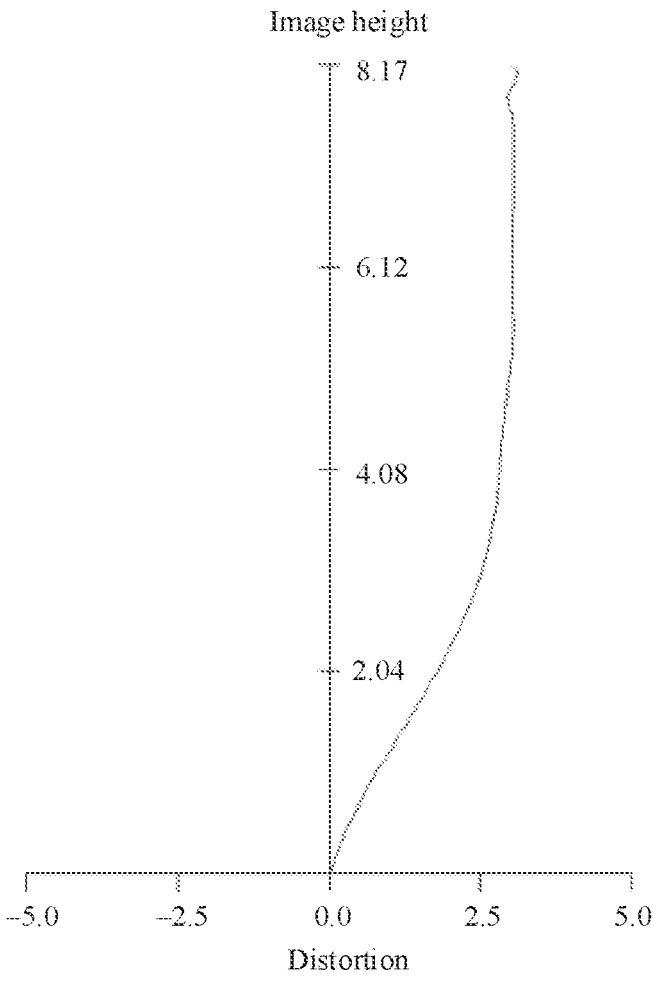
FIG. 11 is a distortion curve diagram of a lens assembly of an electronic device according to Embodiment 2 of this application.

FIG. 11 is a distortion curve diagram of a lens assembly of an electronic device according to Embodiment 2 of this application.

As shown in FIG. 11, optical distortion of the lens assembly 10 is controlled to be within 3%, so that a deformation difference requirement is met, and the imaging quality is high.

Embodiment 3

Figure 12:
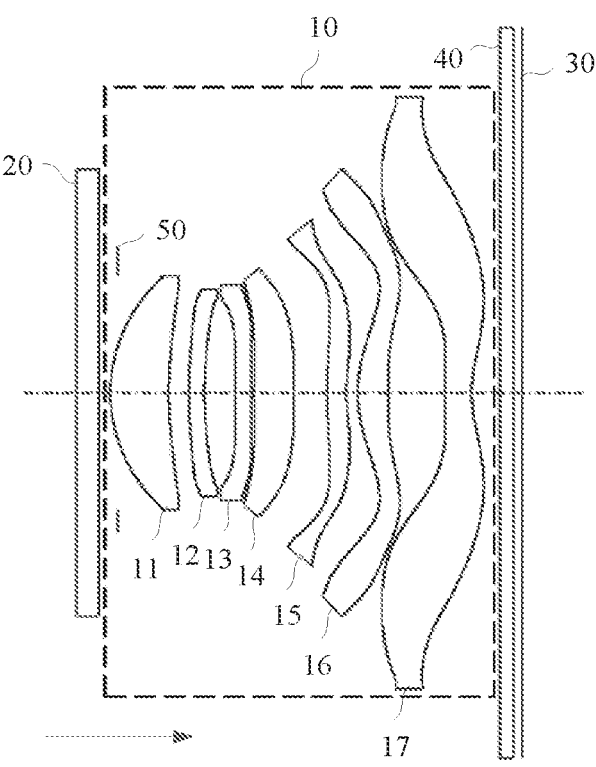
FIG. 12 is a schematic diagram of a simulation structure when a camera module of an electronic device is in a first state according to Embodiment 3 of this application.
Figure 13:
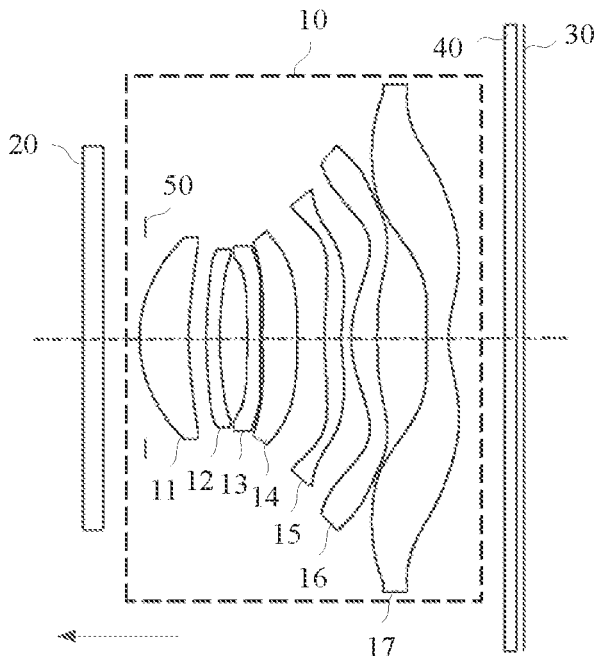
FIG. 13 is a schematic diagram of a simulation structure when a camera module of an electronic device is in a second state according to Embodiment 3 of this application.

FIG. 12 is a schematic diagram of a simulation structure when a camera module of an electronic device is in a first state according to Embodiment 3 of this application. FIG. 13 is a schematic diagram of a simulation structure when a camera module of an electronic device is in a second state according to Embodiment 3 of this application.

In this embodiment, as shown in FIG. 12, a lens assembly 10 includes seven lenses. The lens assembly 10 includes a first lens 11, a second lens 12, a third lens 13, a fourth lens 14, a fifth lens 15, a sixth lens 16, and a seventh lens 17 that are sequentially stacked from an object side to an image side along an optical axis (a dashed line in the figure).

A lens cover 20 is located on one side that is of the first lens 11 and that faces the object side. An image sensor 30 is located on one side that is of the seventh lens 17 and that faces the image side. When the lens cover 20 and the lens assembly 10 retract toward the image side, and the camera module 101 of the electronic device 100 is in the first state (a non-working state), as shown in FIG. 12, the lens cover 20 and the lens assembly 10 are in a retracted state, and a distance between the lens cover 20 and the lens assembly 10 and a distance between the lens assembly 10 and the image sensor 30 are small.

When the lens cover 20 moves toward the object side and extends out of a housing 110, and the camera module 101 of the electronic device 100 is in the second state (a working state), as shown in FIG. 13, avoidance space is left between the lens cover 20 and the image sensor 30, and the lens assembly 10 may move along the optical axis in the avoidance space, to implement focusing.

A retraction/extension ratio SL1/SL2 of the lens cover 20 is equal to 0.867. During photographing, a distance range d from an object-side surface of the lens cover 20 to a photographed object is greater than 120 mm.

The first lens 11 has positive focal power. A part that is of an object-side surface of the first lens 11 and that corresponds to the optical axis is a convex surface, and a part that is of an image-side surface of the first lens 11 and that corresponds to the optical axis is a concave surface.

A focal length f1 of the first lens 11 is equal to 10.17, a total focal length f of the lens assembly 10 is equal to 8.23, and a ratio of the focal length f1 of the first lens 11 to the total focal length f of the lens assembly 10 may satisfy: |f1/f|=1.2356.

The second lens 12 has negative focal power. A part that is of an object-side surface of the second lens 12 and that corresponds to the optical axis is a convex surface, and a part that is of an image-side surface of the second lens 12 and that corresponds to the optical axis is a concave surface. A ratio of a focal length f2 of the second lens 12 to the total focal length f of the lens assembly 10 may satisfy: |f2/f|=16.0208.

An Abbe number vd1 of the first lens 11 is equal to 81.6, an Abbe number vd2 of the second lens 12 is equal to 19.2, and the Abbe number vd1 of the first lens 11 and the Abbe number vd2 of the second lens 12 satisfy: vd1−vd2=62.4>60.

A thickness CT1 of a part that is of the first lens 11 and that corresponds to the optical axis is equal to 1.30, a curvature radius R3 of the object-side surface of the second lens 12 is equal to 9.55, a curvature radius R4 of the image-side surface of the second lens 12 is equal to 8.50, and the first lens 11 and the second lens 12 satisfy: 10<CT1(R3+ R4)/(R3−R4)=22.31<40.

The third lens 13 has negative focal power. A part that is of an object-side surface of the third lens 13 and that corresponds to the optical axis is a concave surface, and a part that is of an image-side surface of the third lens 13 and that corresponds to the optical axis is a concave surface. A ratio of a focal length f3 of the third lens 13 to the total focal length f of the lens assembly 10 may satisfy: |f3/f|=2.5255.

The fourth lens 14 has positive focal power. A part that is of an object-side surface of the fourth lens 14 and that corresponds to the optical axis is a convex surface, and a part that is of an image-side surface of the fourth lens 14 and that corresponds to the optical axis is a convex surface. A ratio of a focal length f4 of the fourth lens 14 to the total focal length f of the lens assembly 10 may satisfy: |f4/f|=2.8477.

The fifth lens 15 has negative focal power. A part that is of an object-side surface of the fifth lens 15 and that corresponds to the optical axis is a convex surface, and a part that is of an image-side surface of the fifth lens 15 and that corresponds to the optical axis is a concave surface. A ratio of a focal length f5 of the fifth lens 15 to the total focal length f of the lens assembly 10 may satisfy: |f5/f|=1.732.

The sixth lens 16 has positive focal power. A part that is of an object-side surface of the sixth lens 16 and that corresponds to the optical axis is a convex surface, and a part that is of an image-side surface of the sixth lens 16 and that corresponds to the optical axis is a concave surface. A ratio of a focal length f6 of the sixth lens 16 to the total focal length f of the lens assembly 10 may satisfy: |f6/f|=0.6561.

The seventh lens 17 has negative focal power. A part that is of an object-side surface of the seventh lens 17 and that corresponds to the optical axis is a convex surface, and a part that is of an image-side surface of the seventh lens 17 and that corresponds to the optical axis is a concave surface. A ratio of a focal length f7 of the seventh lens 17 to the total focal length f of the lens assembly 10 may satisfy: |f7/f|=0.8020.

Table 8 shows optical parameters of lenses in a camera module of an electronic device according to Embodiment 3 of this application.

| Lens | Surface number | Curvature radius | Thickness in a second state | Thickness in a first state | Refractive index | Abbe coefficient |
|---|---|---|---|---|---|---|
| | Object plane | Unlimited | Unlimited | Unlimited | | |
| CG | S1 | Unlimited | 0.5000 | 0.5000 | 1.52 | 64.2 |
| | S2 | Unlimited | 1.1000 | 0.4000 | | |
| −0.1500 | Stop | Unlimited | −0.1500 | | | |
| L1 | S1 | 3.4255 | 1.2980 | 1.2980 | 1.50 | 81.6 |
| | S2 | 9.2415 | 0.4525 | 0.4525 | | |
| L2 | S1 | 9.5467 | 0.3494 | 0.3494 | 1.68 | 19.2 |
| | S2 | 8.4969 | 0.7048 | 0.7048 | | |
| L3 | S1 | −75.2140 | 0.3371 | 0.3371 | 1.68 | 19.2 |
| | S2 | 17.3429 | 0.0639 | 0.0639 | | |
| L4 | S1 | 17.2665 | 0.8906 | 0.8906 | 1.55 | 55.9 |
| | S2 | −48.4480 | 0.7331 | 0.7331 | | |
| L5 | S1 | 6.9851 | 0.4369 | 0.4369 | 1.57 | 37.4 |
| | S2 | 3.6707 | 0.2528 | 0.2528 | | |
| L6 | S1 | 2.8232 | 0.6802 | 0.6802 | 1.55 | 55.9 |
| | S2 | 61.4224 | 1.2688 | 1.2688 | | |
| L7 | S1 | 10.5940 | 0.5918 | 0.5918 | 1.55 | 55.9 |
| | S2 | 2.6352 | 1.4521 | 0.6321 | | |
| IR | S1 | Unlimited | 0.3000 | 0.3000 | 1.52 | 64.2 |
| | S2 | Unlimited | 0.1881 | 0.1881 | | |
| | Image plane | Unlimited | 0.0000 | 0.0000 | | |

CG represents the lens cover 20, L1 is the first lens 11, L2 is the second lens 12, L3 is the third lens 13, L4 is the fourth lens 14, L5 is the fifth lens 15, L6 is the sixth lens 16, L7 is the seventh lens 17, and IR is a light filter 40. S1 represents the object-side surface, and S2 represents the image-side surface.

For a description of a thickness of a lens surface, refer to Embodiment 1. Specifically, a thickness corresponds to S51 in the first state or the second state indicates a distance between an object-side surface of an optical element and an image-side surface of the optical element along the optical axis when the camera module 101 of the electronic device 100 is in the first state or the second state.

A thickness corresponds to S2 in the first state or the second state indicates a distance, along the optical axis, between the image-side surface of the optical element and a lens surface of an optical element adjacent to the image-side surface when the camera module 101 of the electronic device 100 is in the first state or the second state.

Table 9 shows conic coefficients and aspheric coefficients of lenses of a lens assembly in an electronic device according to Embodiment 3 of this application.

lenses may be simulated based on obtained vector heights of the aspheric surfaces, to finally obtain the camera module 101 shown in FIG. 12 and FIG. 13.

For optical parameters of the camera module 101 formed by the foregoing lenses, refer to Table 10.

Table 10 shows optical parameters of a camera module of an electronic device according to Embodiment 3 of this application.

| Optical parameter | |
| --- | --- |
| Total focal length f/mm | 8.23 |
| Equivalent focal length f/mm | 21.81 |
| F-number F# | 1.57 |
| Total image height IH/mm | 16.33 |
| Field of view FOV/degree | 87.83 |
| Retraction ratio | 86.7% |

It can be learned from Table 10 that an image height and an F-number of the lens assembly 10 satisfy: 0.7<IH/(4*F #)=2.60<6. The lens assembly 10 provided in Embodiment 3 of this application has characteristics of a wide aperture

| | | K | A2 | A4 | A6 | A8 | A10 | A12 | A14 |
| --- | --- | --- | --- | --- | --- | --- | --- | --- | --- |
| L1 | S1 | 3.119E−02 | 0.000E+00 | −8.431E−04 | 1.152E−03 | −1.295E−03 | 8.691E−04 | −3.654E−04 | 9.660E−05 |
| | S2 | −3.087E+00 | 0.000E+00 | −3.072E−03 | −4.844E−04 | 8.547E−04 | −7.419E−04 | 3.811E−04 | −1.175E−04 |
| L2 | S1 | −2.586E−01 | 0.000E+00 | −9.802E−03 | 4.763E−03 | −1.087E−02 | 1.797E−02 | −1.996E−02 | 1.573E−02 |
| | S2 | −9.493E−02 | 0.000E+00 | −4.054E−03 | −1.004E−02 | 3.220E−02 | −6.134E−02 | 7.885E−02 | −7.117E−02 |
| L3 | S1 | −9.800E+01 | 0.000E+00 | −1.537E−02 | 3.213E−02 | −7.928E−02 | 1.214E−01 | −1.300E−01 | 9.992E−02 |
| | S2 | 3.482E+00 | 0.000E+00 | −3.463E−02 | 6.877E−02 | −1.123E−01 | 1.219E−01 | −9.399E−02 | 5.268E−02 |
| L4 | S1 | −1.734E+01 | 0.000E+00 | −3.942E−02 | 6.584E−02 | −9.623E−02 | 9.521E−02 | −6.603E−02 | 3.239E−02 |
| | S2 | 2.902E+00 | 0.000E+00 | −1.807E−02 | 1.071E−02 | −1.454E−02 | 1.575E−02 | −1.309E−02 | 7.969E−03 |
| L5 | S1 | 3.781E−03 | 0.000E+00 | −4.973E−02 | 3.487E−02 | −1.961E−02 | 8.556E−03 | −2.928E−03 | 7.489E−04 |
| | S2 | −3.910E−03 | 0.000E+00 | −1.027E−01 | 5.102E−02 | −2.172E−02 | 7.953E−03 | −2.471E−03 | 6.089E−04 |
| L6 | S1 | −1.001E+00 | 0.000E+00 | −3.031E−02 | 5.497E−03 | −5.190E−04 | −3.267E−04 | 1.514E−04 | −3.379E−05 |
| | S2 | −1.784E−01 | 0.000E+00 | 3.381E−02 | −1.428E−02 | 3.792E−03 | −8.480E−04 | 1.507E−04 | −2.039E−05 |
| L7 | S1 | 5.467E+01 | 0.000E+00 | −4.093E−02 | 7.998E−03 | −1.299E−03 | 1.761E−04 | −1.714E−05 | 1.161E−06 |
| | S2 | −1.001E+00 | 0.000E+00 | −4.642E−02 | 1.053E−02 | −2.068E−03 | 3.163E−04 | −3.625E−05 | 3.062E−06 |

| | | A16 | A18 | A20 | A22 | A24 | A26 | A28 | A30 |
| --- | --- | --- | --- | --- | --- | --- | --- | --- | --- |
| L1 | S1 | −1.569E−05 | 1.430E−06 | −5.615E−08 | 0.000E+00 | 0.000E+00 | 0.000E+00 | 0.000E+00 | 0.000E+00 |
| | S2 | 2.129E−05 | −2.071E−06 | 8.253E−08 | 0.000E+00 | 0.000E+00 | 0.000E+00 | 0.000E+00 | 0.000E+00 |
| L2 | S1 | −8.949E−03 | 3.710E−03 | −1.120E−03 | 2.436E−04 | −3.715E−05 | 3.770E−06 | −2.285E−07 | 6.257E−09 |
| | S2 | 4.633E−02 | −2.203E−02 | 7.658E−03 | −1.923E−03 | 3.393E−04 | −3.991E−05 | 2.807E−06 | −8.930E−08 |
| L3 | S1 | −5.603E−02 | 2.309E−02 | −6.985E−03 | 1.532E−03 | −2.373E−04 | 2.461E−05 | −1.533E−06 | 4.341E−08 |
| | S2 | −2.171E−02 | 6.626E−03 | −1.501E−03 | 2.508E−04 | −3.034E−05 | 2.537E−06 | −1.325E−07 | 3.274E−09 |
| L4 | S1 | −1.114E−02 | 2.623E−03 | −3.957E−04 | 3.062E−05 | 5.796E−07 | −3.702E−07 | 3.229E−08 | −9.919E−10 |
| | S2 | −3.499E−03 | 1.107E−03 | −2.521E−04 | 4.082E−05 | −4.578E−06 | 3.375E−07 | −1.470E−08 | 2.860E−10 |
| L5 | S1 | −1.374E−04 | 1.721E−05 | −1.329E−06 | 4.136E−08 | 2.575E−09 | −3.305E−10 | 1.379E−11 | −2.155E−13 |
| | S2 | −1.138E−04 | 1.576E−05 | −1.589E−06 | 1.144E−07 | −5.706E−09 | 1.870E−10 | −3.618E−12 | 3.131E−14 |
| L6 | S1 | 4.773E−06 | −4.540E−07 | 2.972E−08 | −1.341E−09 | 4.098E−11 | −8.104E−13 | 9.358E−15 | −4.792E−17 |
| | S2 | 2.066E−06 | −1.546E−07 | 8.428E−09 | −3.286E−10 | 8.889E−12 | −1.579E−13 | 1.653E−15 | −7.702E−18 |
| L7 | S1 | −5.537E−08 | 1.885E−09 | −4.598E−11 | 7.958E−13 | −9.536E−15 | 7.533E−17 | −3.548E−19 | 7.651E−22 |
| | S2 | −1.892E−07 | 8.530E−09 | −2.789E−10 | 6.525E−12 | −1.063E−13 | 1.146E−15 | −7.337E−18 | 2.114E−20 |

It can be learned from Table 9 that the first lens 11 to the seventh lens 17 include 14 aspheric surfaces in total. Surface types z of the aspheric surfaces of the lenses in the lens assembly 10 may be calculated by using the following aspheric surface formula:

$$z = \frac{cr^2}{1 + \sqrt{1 - (K + 1)c^2 r^2}} + \sum_i \text{Ai} r^i$$

z is a vector height of the aspheric surface, r is a radial coordinate of the aspheric surface, c is a spherical curvature of a vertex of the aspheric surface. K is the conic coefficient, and Ai represents an $i^{th}$-order aspheric coefficient. The and a large optical format, and the lens cover 20 has a small retraction ratio, so that a thinning design requirement of the electronic device 100 is met.

Figure 14:
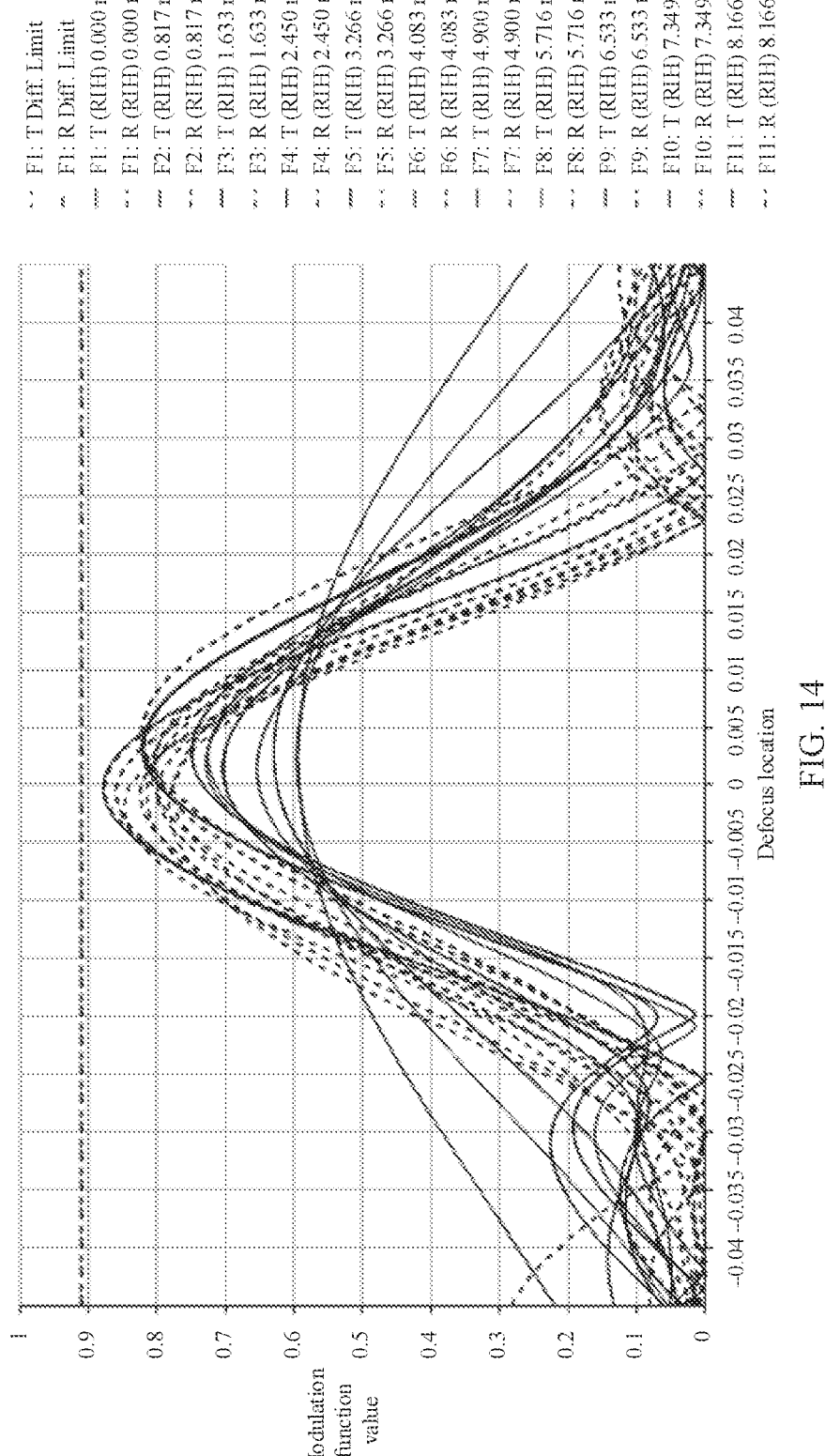
FIG. 14 is a defocus curve diagram of a lens assembly of an electronic device according to Embodiment 3 of this application.

FIG. 14 is a defocus curve diagram of a lens assembly of an electronic device according to Embodiment 3 of this application.

Specifically, FIG. 14 shows a defocus curve of the lens assembly 10 at a spatial frequency of 80 lp/mm. It can be learned from FIG. 14 that modulation transfer function (modulation transfer function, MTF for short) values of the lens assembly 10 in different fields of view are greater than 0.5 in both a sagittal direction and a meridian direction, and field curves of different fields of view are less than 5 μm in both the sagittal direction and the meridian direction, so that the lens assembly 10 has high imaging quality.

Figure 15:
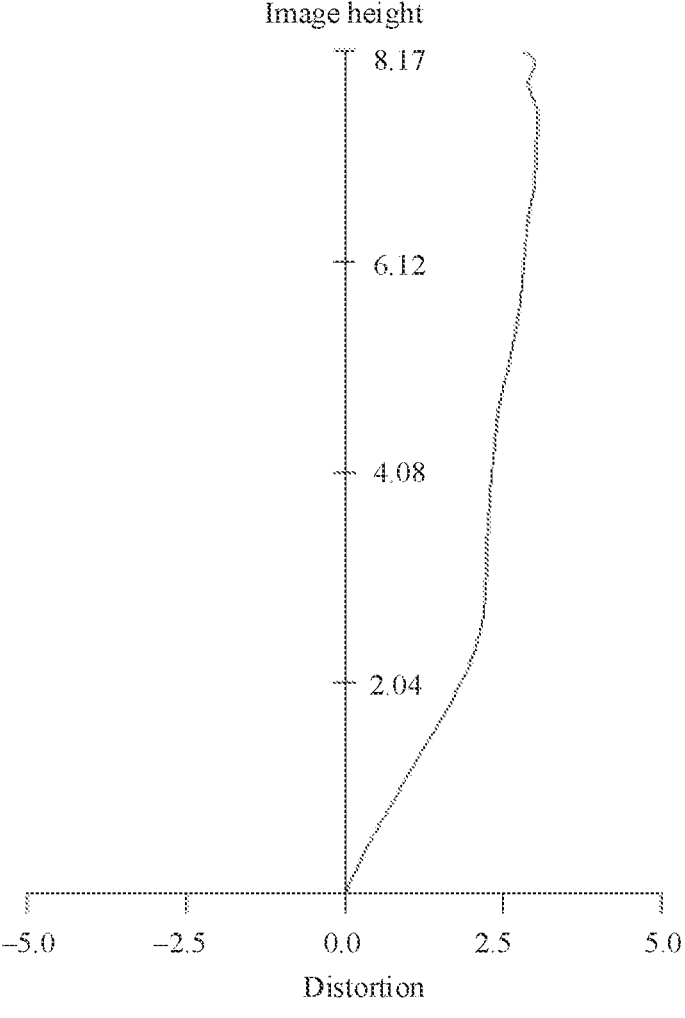
FIG. 15 is a distortion curve diagram of a lens assembly of an electronic device according to Embodiment 3 of this application.

FIG. 15 is a distortion curve diagram of a lens assembly of an electronic device according to Embodiment 3 of this application.

As shown in FIG. 15, optical distortion of the lens assembly 10 is controlled to be within 3%, so that a deformation difference requirement is met, and the imaging quality is high.

Embodiment 4

Figure 16:
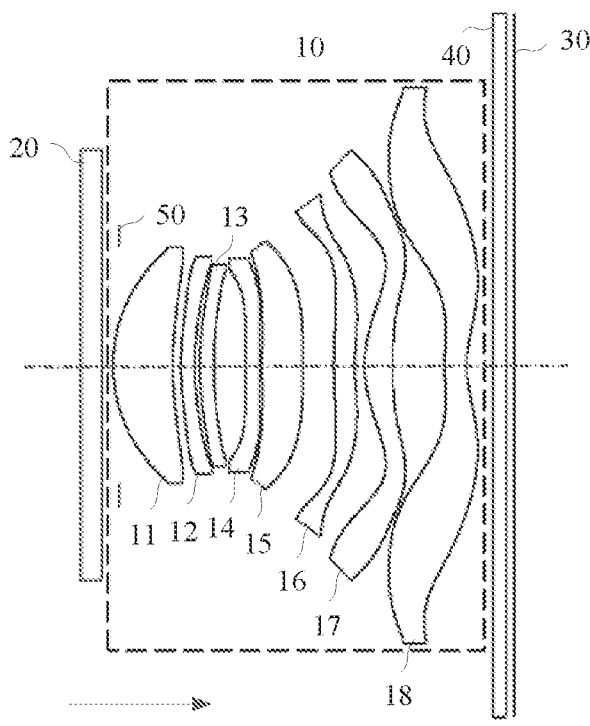
FIG. 16 is a schematic diagram of a simulation structure when a camera module of an electronic device is in a first state according to Embodiment 4 of this application.
Figure 17:
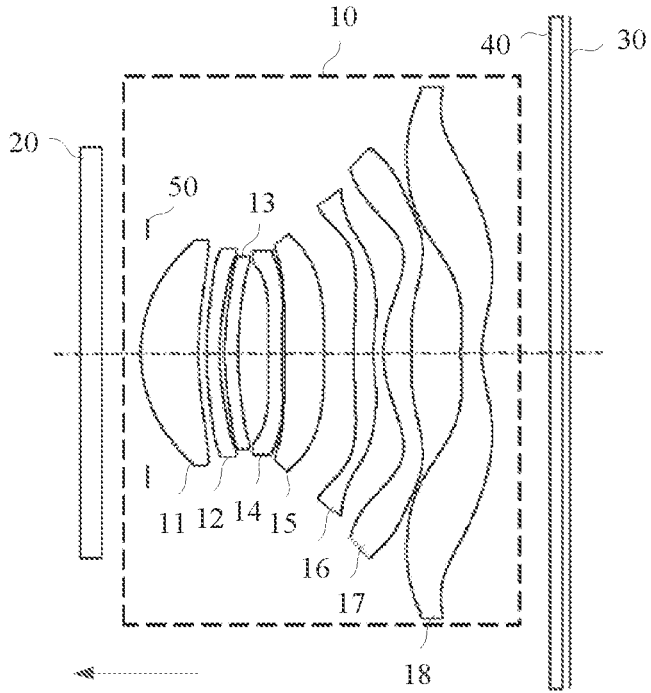
FIG. 17 is a schematic diagram of a simulation structure when a camera module of an electronic device is in a second state according to Embodiment 4 of this application.

FIG. 16 is a schematic diagram of a simulation structure when a camera module of an electronic device is in a first state according to Embodiment 4 of this application. FIG. 17 is a schematic diagram of a simulation structure when a camera module of an electronic device is in a second state according to Embodiment 4 of this application.

In this embodiment, as shown in FIG. 16, a lens assembly 10 includes eight lenses. The lens assembly 10 includes a first lens 11, a second lens 12, a third lens 13, a fourth lens 14, a fifth lens 15, a sixth lens 16, a seventh lens 17, and an eighth lens 18 that are sequentially arranged from an object side to an image side along an optical axis (a dashed line in the figure).

A lens cover 20 is located on one side that is of the first lens 11 and that faces the object side. An image sensor 30 is located on one side that is of the eighth lens 18 and that faces the image side. When the lens cover 20 and the lens assembly 10 retract toward the image side, and the camera module 101 of the electronic device 100 is in the first state (a non-working state), as shown in FIG. 16, the lens cover 20 and the lens assembly 10 are in a retracted state, and a distance between the lens cover 20 and the lens assembly 10 and a distance between the lens assembly 10 and the image sensor 30 are small.

When the lens cover 20 moves toward the object side and extends out of a housing 110, and the camera module 101 of the electronic device 100 is in the second state (a working state), as shown in FIG. 17, avoidance space is left between the lens cover 20 and the image sensor 30, and the lens assembly 10 may move along the optical axis in the avoidance space, to implement focusing.

A retraction/extension ratio SL1/SL2 of the lens cover 20 is equal to 0.854. During photographing, a distance range d from an object-side surface of the lens cover 20 to a photographed object is greater than 120 mm.

The first lens 11 has positive focal power. A part that is of an object-side surface of the first lens 11 and that corresponds to the optical axis is a convex surface, and a part that is of an image-side surface of the first lens 11 and that corresponds to the optical axis is a concave surface.

A focal length f1 of the first lens 11 is equal to 11.49, a total focal length f of the lens assembly 10 is equal to 8.56, and a ratio of the focal length f1 of the first lens 11 to the total focal length f of the lens assembly 10 may satisfy: $|f1/f|=1.3433$.

The second lens 12 has negative focal power. A part that is of an object-side surface of the second lens 12 and that corresponds to the optical axis is a convex surface, and a part that is of an image-side surface of the second lens 12 and that corresponds to the optical axis is a concave surface. A ratio of a focal length f2 of the second lens 12 to the total focal length f of the lens assembly 10 may satisfy: $|f2/f|=9.0453$.

An Abbe number vd1 of the first lens 11 is equal to 81.6, an Abbe number vd2 of the second lens 12 is equal to 20.4, and the Abbe number vd1 of the first lens 11 and the Abbe number vd2 of the second lens 12 satisfy: vd1−vd2=61.2>60.

A thickness CT1 of a part that is of the first lens 11 and that corresponds to the optical axis is equal to 1.39, a curvature radius R3 of the object-side surface of the second lens 12 is equal to 7.20, a curvature radius R4 of the image-side surface of the second lens 12 is equal to 6.21, and the first lens 11 and the second lens 12 satisfy: 10<CT1(R3+R4)/(R3−R4)=18.75<40.

The third lens 13 has positive focal power. A part that is of an object-side surface of the third lens 13 and that corresponds to the optical axis is a convex surface, and a part that is of an image-side surface of the third lens 13 and that corresponds to the optical axis is a concave surface. A ratio of a focal length f3 of the third lens 13 to the total focal length f of the lens assembly 10 may satisfy: $|f3/f|=7.8441$.

The fourth lens 14 has negative focal power. A part that is of an object-side surface of the fourth lens 14 and that corresponds to the optical axis is a convex surface, and a part that is of an image-side surface of the fourth lens 14 and that corresponds to the optical axis is a concave surface. A ratio of a focal length f4 of the fourth lens 14 to the total focal length f of the lens assembly 10 may satisfy: $|f4/f|=2.9070$.

The fifth lens 15 has positive focal power. A part that is of an object-side surface of the fifth lens 15 and that corresponds to the optical axis is a convex surface, and a part that is of an image-side surface of the fifth lens 15 and that corresponds to the optical axis is a convex surface. A ratio of a focal length f5 of the fifth lens 15 to the total focal length f of the lens assembly 10 may satisfy: $|f/f|=3.1719$.

The sixth lens 16 has negative focal power. A part that is of an object-side surface of the sixth lens 16 and that corresponds to the optical axis is a convex surface, and a part that is of an image-side surface of the sixth lens 16 and that corresponds to the optical axis is a concave surface. A ratio of a focal length f6 of the sixth lens 16 to the total focal length f of the lens assembly 10 may satisfy: $|f6/f|=1.5416$.

The seventh lens 17 has positive focal power. A part that is of an object-side surface of the seventh lens 17 and that corresponds to the optical axis is a convex surface, and a part that is of an image-side surface of the seventh lens 17 and that corresponds to the optical axis is a concave surface. A ratio of a focal length f7 of the seventh lens 17 to the total focal length f of the lens assembly 10 may satisfy: $f7/f=0.6172$.

The eighth lens 18 has negative focal power. A part that is of an object-side surface of the eighth lens 18 and that corresponds to the optical axis is a convex surface, and a part that is of an image-side surface of the eighth lens 18 and that corresponds to the optical axis is a concave surface. A ratio of a focal length f8 of the eighth lens 18 to the total focal length f of the lens assembly 10 may satisfy: $|f8/f|=0.8010$.

Table 11 shows optical parameters of lenses in a camera module of an electronic device according to Embodiment 4 of this application.

| Lens | Surface number | Curvature radius | Thickness in a second state | Thickness in a first state | Refractive index | Abbe coefficient |
|---|---|---|---|---|---|---|
| | Object plane | Unlimited | Unlimited | Unlimited | | |
| CG | S1 | Unlimited | 0.5000 | 0.5000 | 1.52 | 64.2 |
| | S2 | Unlimited | 1.1000 | 0.4000 | | |
| | Stop | Unlimited | −0.1500 | −0.1500 | | |

-continued

| Lens | Surface number | Curvature radius | Thickness in a second state | Thickness in a first state | Refractive index | Abbe coefficient |
|---|---|---|---|---|---|---|
| L1 | S1 | 3.4678 | 1.3880 | 1.3880 | 1.50 | 81.6 |
| | S2 | 7.6217 | 0.1957 | 0.1957 | | |
| L2 | S1 | 7.2017 | 0.3150 | 0.3150 | 1.67 | 20.4 |
| | S2 | 6.2089 | 0.1244 | 0.1244 | | |
| L3 | S1 | 6.9266 | 0.3219 | 0.3219 | 1.55 | 55.9 |
| | S2 | 8.4020 | 0.7390 | 0.7390 | | |
| L4 | S1 | 178.7047 | 0.3150 | 0.3150 | 1.68 | 19.2 |
| | S2 | 15.3773 | 0.0679 | 0.0679 | | |
| L5 | S1 | 28.1407 | 0.9534 | 0.9534 | 1.55 | 55.9 |
| | S2 | −30.8898 | 0.7156 | 0.7156 | | |
| L6 | S1 | 8.6494 | 0.4820 | 0.4820 | 1.57 | 37.4 |
| | S2 | 3.9405 | 0.2348 | 0.2348 | | |
| L7 | S1 | 2.8311 | 0.6646 | 0.6646 | 1.55 | 55.9 |
| | S2 | 148.1776 | 1.1969 | 1.1969 | | |
| L8 | S1 | 7.6014 | 0.5053 | 0.5053 | 1.55 | 55.9 |
| | S2 | 2.4479 | 1.6426 | 0.6226 | | |
| IR | S1 | Unlimited | 0.3000 | 0.3000 | 1.52 | 64.2 |
| | S2 | Unlimited | 0.1881 | 0.1881 | | |
| | Image plane | Unlimited | 0.0000 | 0.0000 | | |

CG represents the lens cover 20, L1 is the first lens 11, L2 is the second lens 12, L3 is the third lens 13, LA is the fourth lens 14, L5 is the fifth lens 15, L6 is the sixth lens 16, L7 is the seventh lens 17, L8 is the eighth lens 18, and IR is a light filter 40. S1 represents the object-side surface, and S2 represents the image-side surface.

For a description of a thickness of a lens surface, refer to Embodiment 1. Specifically, a thickness corresponds to S1 in the first state or the second state indicates a distance between an object-side surface of an optical element and an image-side surface of the optical element along the optical axis when the camera module 101 of the electronic device 100 is in the first state or the second state.

A thickness corresponds to S2 in the first state or the second state indicates a distance, along the optical axis, between the image-side surface of the optical element and a lens surface of an optical element adjacent to the image-side surface when the camera module 101 of the electronic device 100 is in the first state or the second state.

For example, a thickness of the image-side surface S2 of the seventh lens 17 in the second state means a distance between the image-side surface of the seventh lens 17 and the object-side surface of the eighth lens 18 along the optical axis when the camera module 101 is in the working state, and a thickness of the image-side surface S2 of the seventh lens 17 in the first state means a distance between the image-side surface of the seventh lens 17 and the object-side surface of the eighth lens 18 along the optical axis when the camera module 101 is in the non-working state.

A thickness of the image-side surface S2 of the eighth lens 18 in the second state means a distance between the image-side surface of the eighth lens 18 and the light filter 40 along the optical axis when the camera module 101 is in the working state, and a thickness of the image-side surface S2 of the eighth lens 18 in the first state means a distance between the image-side surface of the eighth lens 18 and the light filter 40 along the optical axis when the camera module 101 is in the non-working state.

Table 12 shows conic coefficients and aspheric coefficients of lenses of a lens assembly in an electronic device according to Embodiment 4 of this application.

| | | K | A2 | A4 | A6 | A8 | A10 | A12 | A14 |
|---|---|---|---|---|---|---|---|---|---|
| L1 | S1 | 1.529E−02 | 0.000E+00 | −1.862E−04 | 3.362E−04 | −2.707E−04 | 1.493E−04 | −5.316E−05 | 1.218E−05 |
| | S2 | −7.692E+00 | 0.000E+00 | −3.731E−03 | 1.984E−04 | −1.584E−04 | 8.990E−05 | −2.554E−05 | 4.400E−06 |
| L2 | S1 | −5.453E+00 | 0.000E+00 | −8.177E−03 | 3.492E−03 | −6.202E−03 | 8.928E−03 | −8.719E−03 | 5.935E−03 |
| | S2 | −1.241E+00 | 0.000E+00 | −6.723E−03 | 1.691E−03 | 1.749E−06 | −1.197E−03 | 1.862E−03 | −1.784E−03 |
| L3 | S1 | −2.738E+00 | 0.000E+00 | −5.899E−03 | 2.602E−03 | −4.890E−03 | 7.651E−03 | −8.582E−03 | 6.722E−03 |
| | S2 | −2.610E−01 | 0.000E+00 | −1.504E−03 | −8.988E−03 | 2.842E−02 | −5.468E−02 | 6.949E−02 | −6.104E−02 |
| L4 | S1 | 0.000E+00 | 0.000E+00 | −1.706E−02 | 2.947E−02 | −6.683E−02 | 9.747E−02 | −9.900E−02 | 7.184E−02 |
| | S2 | 0.000E+00 | 0.000E+00 | −3.375E−02 | 5.403E−02 | −7.812E−02 | 7.666E−02 | −5.311E−02 | 2.652E−02 |
| L5 | S1 | 0.000E+00 | 0.000E+00 | −3.357E−02 | 4.746E−02 | −5.914E−02 | 4.931E−02 | −2.778E−02 | 1.047E−02 |
| | S2 | 0.000E+00 | 0.000E+00 | −1.471E−02 | 8.698E−03 | −9.298E−03 | 7.618E−03 | −4.945E−03 | 2.432E−03 |
| L6 | S1 | 0.000E+00 | 0.000E+00 | −4.938E−02 | 3.354E−02 | −1.760E−02 | 7.376E−03 | −2.527E−03 | 6.826E−04 |
| | S2 | −1.000E+00 | 0.000E+00 | −9.595E−02 | 3.803E−02 | −1.261E−02 | 3.781E−03 | −1.053E−03 | 2.517E−04 |
| L7 | S1 | −1.000E+00 | 0.000E+00 | −1.529E−02 | −2.685E−03 | 3.538E−03 | −1.937E−03 | 5.941E−04 | −1.161E−04 |
| | S2 | 0.000E+00 | 0.000E+00 | 4.481E−02 | −1.225E−02 | 1.604E−03 | −2.144E−04 | 5.189E−05 | −1.149E−05 |
| L8 | S1 | 0.000E+00 | 0.000E+00 | −6.154E−02 | 1.233E−02 | −2.098E−03 | 2.931E−04 | −2.941E−05 | 2.064E−06 |
| | S2 | −1.000E+00 | 0.000E+00 | −7.151E−02 | 1.784E−02 | −3.747E−03 | 6.058E−04 | −7.270E−05 | 6.411E−06 |

| | | A16 | A18 | A20 | A22 | A24 | A26 | A28 | A30 |
|---|---|---|---|---|---|---|---|---|---|
| L1 | S1 | −1.742E−06 | 1.414E−07 | −5.049E−09 | 0.000E+00 | 0.000E+00 | 0.000E+00 | 0.000E+00 | 0.000E+00 |
| | S2 | −4.299E−07 | 1.789E−08 | −9.668E−11 | 0.000E+00 | 0.000E+00 | 0.000E+00 | 0.000E+00 | 0.000E+00 |
| L2 | S1 | −2.865E−03 | 9.914E−04 | −2.467E−04 | 4.375E−05 | −5.39SE−06 | 4.396E−07 | −2.127E−08 | 4.627E−10 |
| | S2 | 1.185E−03 | −5.554E−04 | 1.831E−04 | −4.203E−05 | 6.561E−06 | −6.635E−07 | 3.916E−08 | −1.024E−09 |

-continued

| | | | | | | | | |
|---|---|---|---|---|---|---|---|---|
| L3 | S1 | −3.738E−03 | 1.500E−03 | −4.364E−04 | 9.134E−05 | −1.340E−05 | 1.307E−06 | −7.595E−08 | 1.988E−09 |
| | S2 | 3.808E−02 | −1.710E−02 | 5.540E−03 | −1.282E−03 | 2.065E−04 | −2.199E−05 | 1.390E−06 | −3.951E−08 |
| L4 | S1 | −3.794E−02 | 1.470E−02 | −4.177E−03 | 8.590E−04 | −1.244E−04 | 1.201E−05 | −6.944E−07 | 1.815E−08 |
| | S2 | −9.707E−03 | 2.632E−03 | −5.306E−04 | 7.908E−05 | −8.541E−06 | 6.383E−07 | −2.975E−08 | 6.538E−10 |
| L5 | S1 | −2.490E−03 | 2.860E−04 | 2.363E−05 | −1.539E−05 | 2.809E−06 | −2.761E−07 | 1.469E−08 | −3.332E−10 |
| | S2 | −8.813E−04 | 2.330E−04 | −4.460E−05 | 6.094E−06 | −5.779E−07 | 3.608E−08 | −1.331E−09 | 2.194E−11 |
| L6 | S1 | −1.409E−04 | 2.168E−05 | −2.439E−06 | 1.965E−07 | −1.098E−08 | 4.040E−10 | −8.784E−12 | 8.558E−14 |
| | S2 | −4.740E−05 | 6.668E−06 | −6.789E−07 | 4.882E−08 | −2.406E−09 | 7.718E−11 | −1.450E−12 | 1.211E−14 |
| L7 | S1 | 1.528E−05 | −1.392E−06 | 8.866E−08 | 4.882E−08 | −2.406E−09 | 7.718E−11 | −1.450E−12 | 1.211E−14 |
| | S2 | 1.671E−06 | −1.594E−07 | 1.025E−08 | −4.480E−10 | 1.316E−11 | −2.489E−13 | 2.736E−15 | −1.329E−17 |
| L8 | S1 | −1.025E−07 | 3.641E−09 | −9.286E−11 | 1.683E−12 | −2.112E−14 | 1.745E−16 | −8.574E−19 | 1.915E−21 |
| | S2 | −4.147E−07 | 1.965E−08 | −6.780E−10 | 1.681E−11 | −2.911E−13 | 3.340E−15 | −2.280E−17 | 7.011E−20 |

It can be learned from Table 12 that the first lens 11 to the eighth lens 18 include 16 aspheric surfaces in total. Surface types z of the aspheric surfaces of the lenses in the lens assembly 10 may be calculated by using the following aspheric surface formula:

$$z = \frac{cr^2}{1 + \sqrt{1 - (K+1)c^2r^2}} + \sum_i \text{Air}^i$$

z is a vector height of the aspheric surface, r is a radial coordinate of the aspheric surface, c is a spherical curvature of a vertex of the aspheric surface. K is the conic coefficient, and Ai represents an $i^{th}$-order aspheric coefficient. The lenses may be simulated based on obtained vector heights of the aspheric surfaces, to finally obtain the camera module 101 shown in FIG. 16 and FIG. 17.

For optical parameters of the camera module 101 formed by the foregoing lenses, refer to Table 13.

Table 13 shows optical parameters of a camera module of an electronic device according to Embodiment 4 of this application.

| Optical parameter | |
|---|---|
| Total focal length f/mm | 8.56 |
| Equivalent focal length f/mm | 22.67 |
| F-number F# | 1.55 |
| Total image height IH/mm | 16.34 |
| Field of view FOV/degree | 85.5 |
| Retraction ratio | 85.4% |

It can be learned from Table 13 that an image height and an F-number of the lens assembly 10 satisfy: 0.7<IH/(4*F #)≈2.64<6. The lens assembly 10 provided in Embodiment 4 of this application has characteristics of a wide aperture and a large optical format, and the lens cover 20 has a small retraction ratio, so that a thinning design requirement of the electronic device 100 is met.

Figure 18:
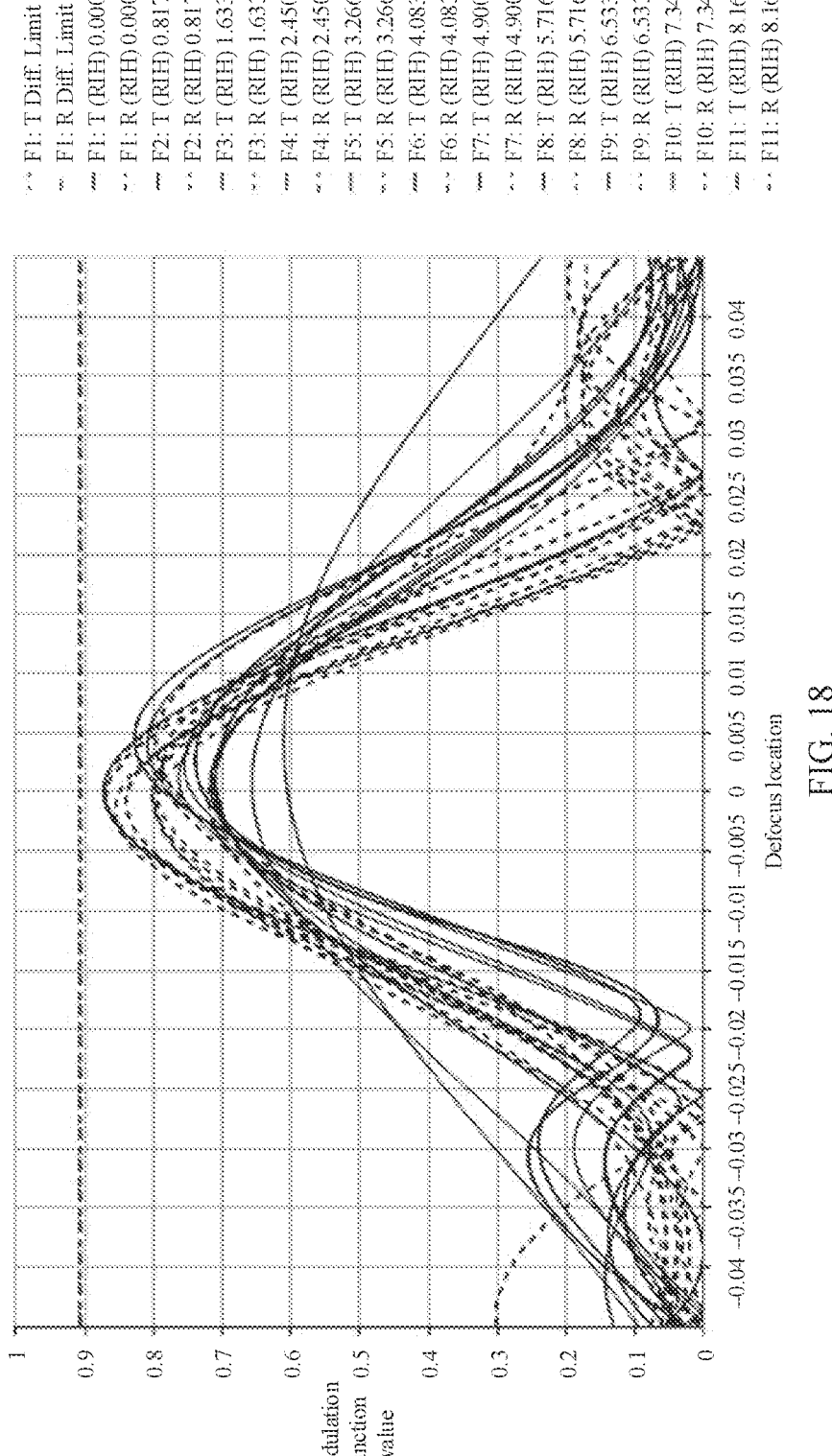
FIG. 18 is a defocus curve diagram of a lens assembly of an electronic device according to Embodiment 4 of this application.

FIG. 18 is a defocus curve diagram of a lens assembly of an electronic device according to Embodiment 4 of this application.

Specifically, FIG. 18 shows a defocus curve of the lens assembly 10 at a spatial frequency of 80 lp/mm. It can be learned from FIG. 6 that modulation transfer function MTF values of the lens assembly 10 in different fields of view are greater than 0.6 in both a sagittal direction and a meridian direction, and field curves of different fields of view are less than 5 μm in both the sagittal direction and the meridian direction, so that the lens assembly 10 has high imaging quality.

Figure 19:
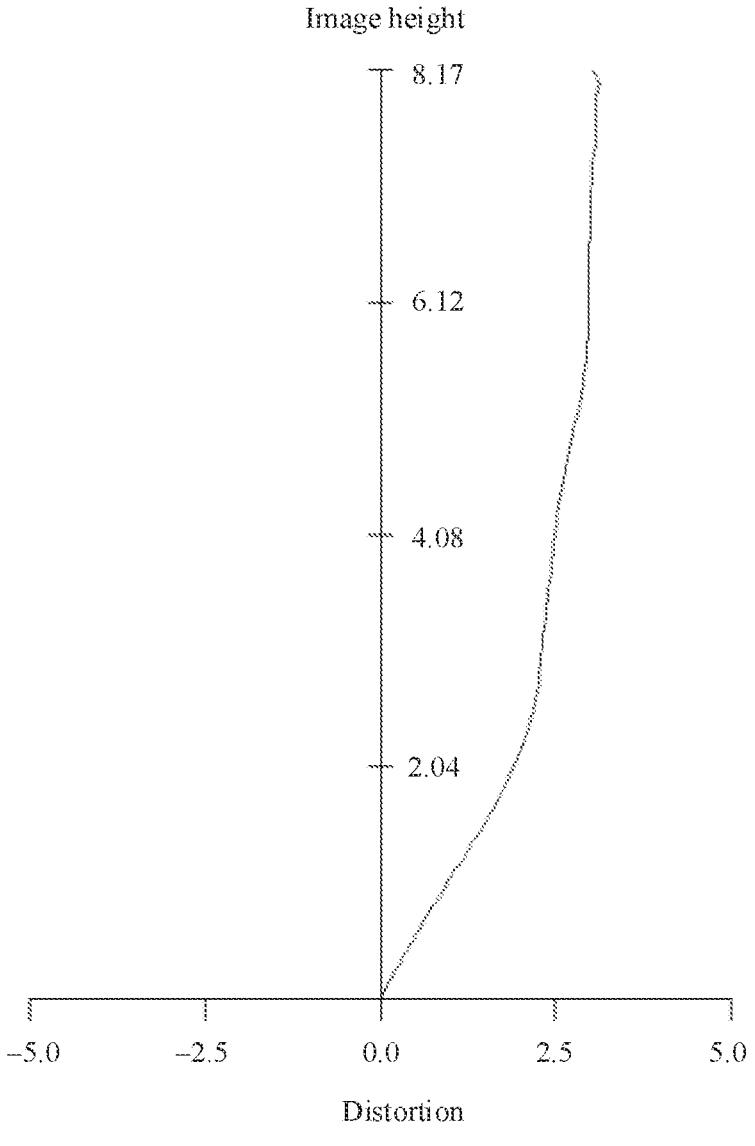
FIG. 19 is a distortion curve diagram of a lens assembly of an electronic device according to Embodiment 4 of this application.

FIG. 19 is a distortion curve diagram of a lens assembly of an electronic device according to Embodiment 4 of this application.

As shown in FIG. 19, optical distortion of the lens assembly 10 is controlled to be within 3%, so that a deformation difference requirement is met, and the imaging quality is high.

Embodiment 5

Figure 20:
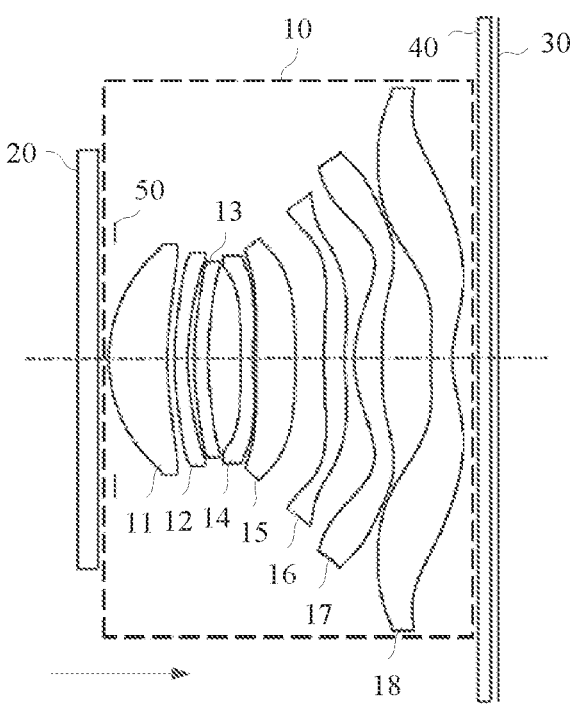
FIG. 20 is a schematic diagram of a simulation structure when a camera module of an electronic device is in a first state according to Embodiment 5 of this application.
Figure 21:
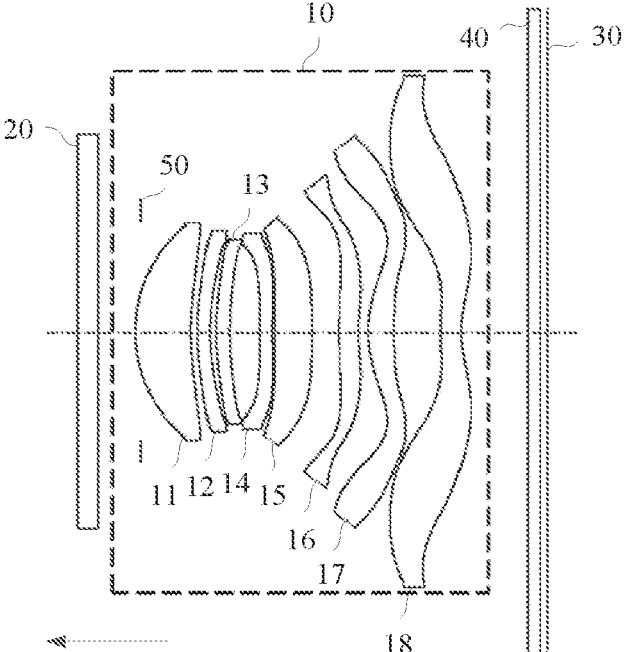
FIG. 21 is a schematic diagram of a simulation structure when a camera module of an electronic device is in a second state according to Embodiment 5 of this application.

FIG. 20 is a schematic diagram of a simulation structure when a camera module of an electronic device is in a first state according to Embodiment 5 of this application. FIG. 21 is a schematic diagram of a simulation structure when a camera module of an electronic device is in a second state according to Embodiment 5 of this application.

In this embodiment, as shown in FIG. 20, a lens assembly 10 includes eight lenses. The lens assembly 10 includes a first lens 11, a second lens 12, a third lens 13, a fourth lens 14, a fifth lens 15, a sixth lens 16, a seventh lens 17, and an eighth lens 18 that are sequentially stacked from an object side to an image side along an optical axis (a dashed line in the figure).

A lens cover 20 is located on one side that is of the first lens 11 and that faces the object side. An image sensor 30 is located on one side that is of the eighth lens 18 and that faces the image side. When the lens cover 20 and the lens assembly 10 retract toward the image side, and the camera module 101 of the electronic device 100 is in the first state (a non-working state), as shown in FIG. 20, the lens cover 20 and the lens assembly 10 are in a retracted state, and a distance between the lens cover 20 and the lens assembly 10 and a distance between the lens assembly 10 and the image sensor 30 are small.

When the lens cover 20 moves toward the object side and extends out of a housing 110, and the camera module 101 of the electronic device 100 is in the second state (a working state), as shown in FIG. 21, avoidance space is left between the lens cover 20 and the image sensor 30, and the lens assembly 10 may move along the optical axis in the avoidance space, to implement focusing.

A retraction/extension ratio SL1/SL2 of the lens cover 20 is equal to 0.851. During photographing, a distance range d from an object-side surface of the lens cover 20 to a photographed object is greater than 120 mm.

The first lens 11 has positive focal power. A part that is of an object-side surface of the first lens 11 and that corresponds to the optical axis is a convex surface, and a part that is of an image-side surface of the first lens 11 and that corresponds to the optical axis is a concave surface.

A focal length f1 of the first lens 11 is equal to 11.78, a total focal length f of the lens assembly 10 is equal to 8.60, and a ratio of the focal length f1 of the first lens 11 to the total focal length f of the lens assembly 10 may satisfy: |f1/f|=1.3691.

The second lens 12 has negative focal power. A part that is of an object-side surface of the second lens 12 and that corresponds to the optical axis is a convex surface, and a part that is of an image-side surface of the second lens 12 and that corresponds to the optical axis is a concave surface. A ratio of a focal length 12 of the second lens 12 to the total focal length f of the lens assembly 10 may satisfy: |f2/f|=9.8198.

An Abbe number vd1 of the first lens 11 is equal to 81.6, an Abbe number vd2 of the second lens 12 is equal to 20.4, and the Abbe number vd1 of the first lens 11 and the Abbe number vd2 of the second lens 12 satisfy: vd1−vd2=61.2>60.

A thickness CT1 of a part that is of the first lens 11 and that corresponds to the optical axis is equal to 1.40, a curvature radius R3 of the object-side surface of the second lens 12 is equal to 6.62, a curvature radius R4 of the image-side surface of the second lens 12 is equal to 5.81, and the first lens 11 and the second lens 12 satisfy: 10<CT1(R3+R4)/(R3−R4)=21.45<40.

The third lens 13 has positive focal power. A part that is of an object-side surface of the third lens 13 and that corresponds to the optical axis is a convex surface, and a part that is of an image-side surface of the third lens 13 and that corresponds to the optical axis is a concave surface. A ratio of a focal length 3 of the third lens 13 to the total focal length f of the lens assembly 10 may satisfy: |f3/f|=6.6576.

The fourth lens 14 has negative focal power. A part that is of an object-side surface of the fourth lens 14 and that corresponds to the optical axis is a concave surface, and a part that is of an image-side surface of the fourth lens 14 and that corresponds to the optical axis is a concave surface. A ratio of a focal length f4 of the fourth lens 14 to the total focal length f of the lens assembly 10 may satisfy: |f4/f|=2.9026.

The fifth lens 15 has positive focal power. A part that is of an object-side surface of the fifth lens 15 and that corresponds to the optical axis is a convex surface, and a part that is of an image-side surface of the fifth lens 15 and that corresponds to the optical axis is a convex surface. A ratio of a focal length f5 of the fifth lens 15 to the total focal length f of the lens assembly 10 may satisfy: |f5/f|=3.4018.

The sixth lens 16 has negative focal power. A part that is of an object-side surface of the sixth lens 16 and that corresponds to the optical axis is a convex surface, and a part that is of an image-side surface of the sixth lens 16 and that corresponds to the optical axis is a concave surface. A ratio of a focal length f6 of the sixth lens 16 to the total focal length f of the lens assembly 10 may satisfy: |f6/f|=1.5108.

The seventh lens 17 has positive focal power. A part that is of an object-side surface of the seventh lens 17 and that corresponds to the optical axis is a convex surface, and a part that is of an image-side surface of the seventh lens 17 and that corresponds to the optical axis is a concave surface. A ratio of a focal length f7 of the seventh lens 17 to the total focal length f of the lens assembly 10 may satisfy: |f7/f|=0.6061.

The eighth lens 18 has negative focal power. A part that is of an object-side surface of the eighth lens 18 and that corresponds to the optical axis is a convex surface, and a part that is of an image-side surface of the eighth lens 18 and that corresponds to the optical axis is a concave surface. A ratio of a focal length f of the eighth lens 18 to the total focal length f of the lens assembly 10 may satisfy: |f8/f|=0.8015.

Table 14 shows optical parameters of lenses in a camera module of an electronic device according to Embodiment 5 of this application.

| Lens | Surface number | Curvature radius | Thickness in a second state | Thickness in a first state | Refractive index | Abbe coefficient |
|------|------|------|------|------|------|------|
| | Object plane | Unlimited | Unlimited | Unlimited | | |
| CG | S1 | Unlimited | 0.5000 | 0.5000 | 1.52 | 64.2 |
| | S2 | Unlimited | 1.1000 | 0.4000 | | |
| | Stop | Unlimited | −0.1500 | −0.1500 | | |
| L1 | S1 | 3.4790 | 1.3959 | 1.3959 | 1.50 | 81.6 |
| | S2 | 7.4039 | 0.1743 | 0.1743 | | |
| L2 | S1 | 6.6202 | 0.3150 | 0.3150 | 1.67 | 20.4 |
| | S2 | 5.8111 | 0.1542 | 0.1542 | | |
| L3 | S1 | 6.8294 | 0.3435 | 0.3435 | 1.55 | 55.9 |
| | S2 | 8.5836 | 0.7662 | 0.7662 | | |
| L4 | S1 | −100.0000 | 0.3153 | 0.3153 | 1.68 | 19.2 |
| | S2 | 20.3711 | 0.0620 | 0.0620 | | |
| L5 | S1 | 33.8523 | 0.9360 | 0.9360 | 1.55 | 55.9 |
| | S2 | −29.9408 | 0.6883 | 0.6883 | | |
| L6 | S1 | 9.0628 | 0.4883 | 0.4883 | 1.57 | 37.4 |
| | S2 | 3.9963 | 0.2352 | 0.2352 | | |
| L7 | S1 | 2.8048 | 0.6653 | 0.6653 | 1.55 | 55.9 |
| | S2 | 178.3516 | 1.1643 | 1.1643 | | |
| L8 | S1 | 7.5652 | 0.5150 | 0.5150 | 1.55 | 55.9 |
| | S2 | 2.4527 | 1.6932 | 0.6232 | | |
| IR | S1 | Unlimited | 0.3000 | 0.3000 | 1.52 | 64.2 |
| | S2 | Unlimited | 0.1881 | 0.1881 | | |
| | Image plane | Unlimited | 0.0000 | 0.0000 | | |

CG represents the lens cover 20, L1 is the first lens 11, L2 is the second lens 12, L3 is the third lens 13, L4 is the fourth lens 14, L5 is the fifth lens 15, L6 is the sixth lens 16, L7 is the seventh lens 17, L8 is the eighth lens 18, and IR is a light filter 40. S1 represents the object-side surface, and S2 represents the image-side surface.

For a description of a thickness of a lens surface, refer to Embodiment 1. Specifically, a thickness corresponds to S1 in the first state or the second state indicates a distance between an object-side surface of an optical element and an image-side surface of the optical element along the optical axis when the camera module 101 of the electronic device 100 is in the first state or the second state.

A thickness corresponds to S2 in the first state or the second state indicates a distance, along the optical axis, between the image-side surface of the optical element and a lens surface of an optical element adjacent to the image-side surface when the camera module 101 of the electronic device 100 is in the first state or the second state.

Table 15 shows conic coefficients and aspheric coefficients of lenses of a lens assembly in an electronic device according to Embodiment 5 of this application.

| | | K | A2 | A4 | A6 | A8 | A10 | A12 | A14 |
|---|---|---|---|---|---|---|---|---|---|
| L1 | S1 | 1.328E−02 | 0.000E+00 | −1.477E−04 | 2.801E−04 | −2.089E−04 | 1.106E−04 | −3.871E−05 | 8.937E−06 |
| | S2 | −8.199E+00 | 0.000E+00 | −4.146E−03 | 2.401E−04 | −2.208E−04 | 1.963E−04 | −8.272E−05 | 1.986E−05 |
| L2 | S1 | −5.765E+00 | 0.000E+00 | −7.876E−03 | 2.347E−03 | −4.328E−03 | 6.404E−03 | −6.130E−03 | 4.066E−03 |
| | S2 | −1.282E+00 | 0.000E+00 | −4.825E−03 | −2.477E−03 | 8.113E−03 | −1.324E−02 | 1.428E−02 | −1.061E−02 |
| L3 | S1 | −2.654E+00 | 0.000E+00 | −3.661E−03 | 8.551E−04 | −3.970E−03 | 7.949E−03 | −1.024E−02 | 8.882E−03 |
| | S2 | −8.231E−01 | 0.000E+00 | −7.133E−04 | −7.884E−03 | 2.244E−02 | −4.113E−02 | 5.029E−02 | −4.286E−02 |
| L4 | S1 | −9.369E+01 | 0.000E+00 | −1.688E−02 | 3.044E−02 | −6.949E−02 | 1.011E−01 | −1.023E−01 | 7.416E−02 |
| | S2 | 1.658E+00 | 0.000E+00 | −3.528E−02 | 6.490E−02 | −9.953E−02 | 1.012E−01 | −7.207E−02 | 3.699E−02 |
| L5 | S1 | −3.083E+01 | 0.000E+00 | −3.485E−02 | 5.812E−02 | −7.816E−02 | 6.853E−02 | −4.058E−02 | 1.641E−02 |
| | S2 | −4.731E+00 | 0.000E+00 | −1.433E−02 | 9.687E−03 | −1.087E−02 | 8.944E−03 | −5.747E−03 | 2.801E−03 |
| L6 | S1 | −1.734E−02 | 0.000E+00 | −4.884E−02 | 3.477E−02 | −1.890E−02 | 8.086E−03 | −2.796E−03 | 7.602E−04 |
| | S2 | −9.962E−01 | 0.000E+00 | −9.734E−02 | 4.005E−02 | −1.396E−02 | 4.312E−03 | −1.192E−03 | 2.766E−04 |
| L7 | S1 | −1.001E+00 | 0.000E+00 | −1.670E−02 | −1.448E−03 | 2.859E−03 | −1.683E−03 | 5.247E−04 | −1.027E−04 |
| | S2 | −3.371E+01 | 0.000E+00 | 4.550E−02 | −1.276E−02 | 1.928E−03 | −3.395E−04 | 8.074E−05 | −1.578E−05 |
| L8 | S1 | 5.151E−03 | 0.000E+00 | −6.050E−02 | 1.168E−02 | −1.862E−03 | 2.466E−04 | −2.380E−05 | 1.614E−06 |
| | S2 | −1.001E+00 | 0.000E+00 | −7.086E−02 | 1.748E−02 | −3.630E−03 | 5.842E−04 | −7.021E−05 | 6.228E−06 |

| | | A16 | A18 | A20 | A22 | A24 | A26 | A28 | A30 |
|---|---|---|---|---|---|---|---|---|---|
| L1 | S1 | −1.315E−06 | 1.112E−07 | −4.174E−09 | 0.000E+00 | 0.000E+00 | 0.000E+00 | 0.000E+00 | 0.000E+00 |
| | S2 | −2.717E−06 | 1.937E−07 | −5.573E−09 | 0.000E+00 | 0.000E+00 | 0.000E+00 | 0.000E+00 | 0.000E+00 |
| L2 | S1 | −1.916E−03 | 6.484E−04 | −1.580E−04 | 2.748E−05 | −3.328E−06 | 2.669E−07 | −1.275E−08 | 2.745E−10 |
| | S2 | 5.579E−03 | −2.104E−03 | 5.705E−04 | −1.100E−04 | 1.470E−05 | −1.292E−06 | 6.718E−08 | −1.564E−09 |
| L3 | S1 | −5.373E−03 | 2.313E−03 | −7.130E−04 | 1.561E−04 | −2.368E−05 | 2.361E−06 | −1.389E−07 | 3.651E−09 |
| | S2 | 2.612E−02 | −1.152E−02 | 3.684E−03 | −8.439E−04 | 1.349E−04 | −1.429E−05 | 9.000E−07 | −2.551E−08 |
| L4 | S1 | −3.925E−02 | 1.530E−02 | −4.384E−03 | 9.114E−04 | −1.336E−04 | 1.309E−05 | −7.677E−07 | 2.038E−08 |
| | S2 | −1.396E−02 | 3.926E−03 | −8.248E−04 | 1.284E−04 | −1.446E−05 | 1.116E−06 | −5.298E−08 | 1.165E−09 |
| L5 | S1 | −4.464E−03 | 7.645E−04 | −6.194E−05 | −4.073E−06 | 1.714E−06 | −2.018E−07 | 1.151E−08 | −2.689E−10 |
| | S2 | −1.010E−03 | 2.670E−04 | −5.121E−05 | 7.021E−06 | −6.687E−07 | 4.194E−08 | −1.554E−09 | 2.574E−11 |
| L6 | S1 | −1.582E−04 | 2.468E−05 | −2.834E−06 | 2.344E−07 | −1.355E−08 | 5.182E−10 | −1.178E−11 | 1.204E−13 |
| | S2 | −5.048E−05 | 6.925E−06 | −6.923E−07 | 4.916E−08 | −2.402E−09 | 7.661E−11 | −1.434E−12 | 1.194E−14 |
| L7 | S1 | 1.348E−05 | −1.225E−06 | 7.788E−08 | −3.455E−09 | 1.048E−10 | −2.071E−12 | 2.401E−14 | −1.239E−16 |
| | S2 | 2.109E−06 | −1.914E−07 | 1.194E−08 | −5.136E−10 | 1.497E−11 | −2.826E−13 | 3.118E−15 | −1.526E−17 |
| L8 | S1 | −7.734E−08 | 2.639E−09 | −6.404E−11 | 1.090E−12 | 1.497E−11 | −2.826E−13 | 3.118E−15 | −1.526E−17 |
| | S2 | −4.065E−07 | 1.947E−08 | −6.799E−10 | 1.706E−11 | −2.991E−13 | 3.472E−15 | −2.398E−17 | 7.452E−20 |

It can be learned from Table 15 that the first lens 11 to the eighth lens 18 include 16 aspheric surfaces in total. Surface types z of the aspheric surfaces of the lenses in the lens assembly 10 may be calculated by using the following aspheric surface formula:

$$z = \frac{cr^2}{1 + \sqrt{1 - (K+1)c^2r^2}} + \sum_i \text{Ai}r^i$$

z is a vector height of the aspheric surface, r is a radial coordinate of the aspheric surface, c is a spherical curvature of a vertex of the aspheric surface, K is the conic coefficient, and Ai represents an $i^{th}$-order aspheric coefficient. The lenses may be simulated based on obtained vector heights of the aspheric surfaces, to finally obtain the camera module 101 shown in FIG. 20 and FIG. 21.

For optical parameters of the camera module 101 formed by the foregoing lenses, refer to Table 16.

Table 16 shows optical parameters of a camera module of an electronic device according to Embodiment 5 of this application.

| Optical parameter | |
| --- | --- |
| Total focal length f/mm | 8.60 |
| Equivalent focal length f/mm | 22.80 |
| F-number F# | 1.55 |
| Total image height IH/mm | 16.33 |
| Field of view FOV/degree | 85.17 |
| Retraction ratio | 85.1% |

It can be learned from Table 16 that an image height and an F-number of the lens assembly 10 satisfy: 0.7<IH/(4*F #)=2.63<6. The lens assembly 10 provided in Embodiment 5 of this application has characteristics of a wide aperture and a large optical format, and the lens cover 20 has a small retraction ratio, so that a thinning design requirement of the electronic device 100 is met.

Figure 22:
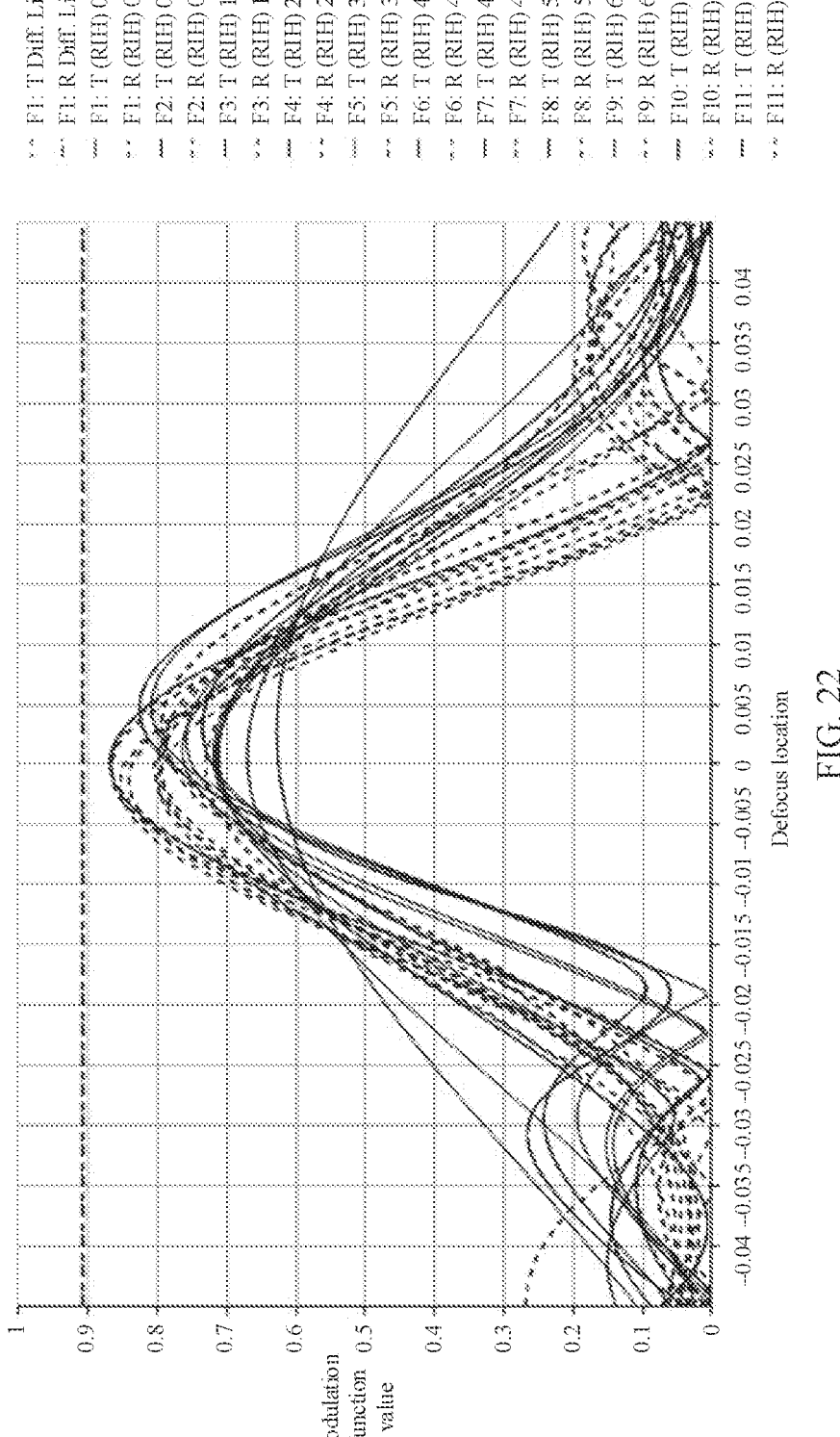
FIG. 22 is a defocus curve diagram of a lens assembly of an electronic device according to Embodiment 5 of this application.

FIG. 22 is a defocus curve diagram of a lens assembly of an electronic device according to Embodiment 5 of this application.

Specifically, FIG. 22 shows a defocus curve of the lens assembly 10 at a spatial frequency of 80 lp/mm. It can be learned from FIG. 22 that modulation transfer function MTF values of the lens assembly 10 in different fields of view are greater than 0.6 in both a sagittal direction and a meridian direction, and field curves of different fields of view are less than 5 μm in both the sagittal direction and the meridian direction, so that the lens assembly 10 has high imaging quality.

Figure 23:
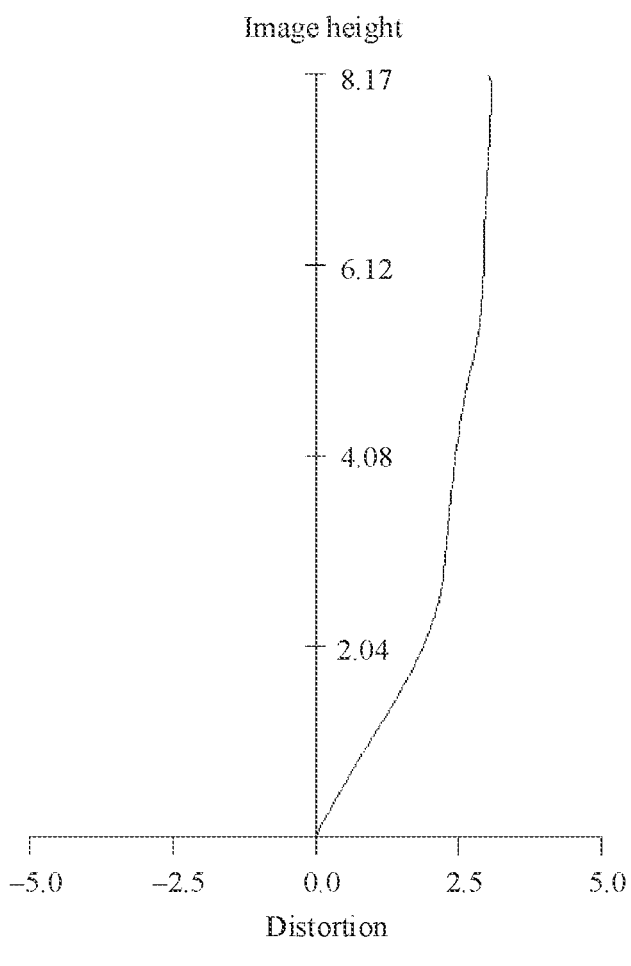
FIG. 23 is a distortion curve diagram of a lens assembly of an electronic device according to Embodiment 5 of this application.

FIG. 23 is a distortion curve diagram of a lens assembly of an electronic device according to Embodiment 5 of this application.

As shown in FIG. 23, optical distortion of the lens assembly 10 is controlled to be within 3%, so that a deformation difference requirement is met, and the imaging quality is high.

It should be noted that values and value ranges in embodiments of this application are approximate values, and there may be an error within a specific range. A person skilled in the art may consider that the error is negligible.

Finally, it should be noted that the foregoing embodiments are merely intended for describing the technical solutions of embodiments of this application other than limiting this application. Although embodiments of this application are described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of embodiments of this application.

The invention claimed is:

1. An electronic device, comprising a housing, a lens cover, and a lens assembly disposed in the housing, wherein:
   the lens assembly comprises a plurality of lenses sequentially arranged from an object side to an image side along an optical axis;
   the lens cover is located on one side that is of the lens assembly and that faces the object side, the lens cover extends out of the housing along the optical axis to form avoidance space, and at least one lens that is in the lens assembly and that is close to the object side is configured to move in the avoidance space along the optical axis;
   the lens assembly satisfies a conditional expression: 0.7<IH/(4*F #)<6, wherein IH is a total image height of the lens assembly, and F # is an F-number of the lens assembly; and
   an equivalent focal length of the lens assembly is between 18 mm and 30 mm.

2. The electronic device according to claim 1, further comprising a cover driving apparatus and a lens driving apparatus, wherein:
   the cover driving apparatus is configured to drive the lens cover to move along the optical axis; and
   the lens driving apparatus is configured to drive the at least one lens that is in the lens assembly and that is close to the object side to move along the optical axis.

3. The electronic device according to claim 1, wherein a retraction/extension ratio of the lens cover is less than 0.95.

4. The electronic device according to claim 1, wherein:
   the plurality of lenses each have focal power; and
   the lens assembly comprises at least a first lens, a second lens, a third lens, a fourth lens, and a fifth lens that are sequentially arranged from the object side to the image side.

5. The electronic device according to claim 4, wherein an Abbe number vd1 of the first lens and an Abbe number vd2 of the second lens satisfy a conditional expression: |vd1−vd2|>60.

6. The electronic device according to claim 4, wherein a focal length f1 of the first lens and a total focal length f of the lens assembly satisfy a conditional expression: 0.5≤|f1/f|≤1.4.

7. The electronic device according to claim 5, wherein the first lens and the second lens satisfy a conditional expression: 10<CT1(R3+R4)/(R3−R4)<40, wherein
   CT1 is a thickness of a part that is of the first lens and that corresponds to the optical axis, R3 is a curvature radius of an object-side surface of the second lens, and R4 is a curvature radius of an image-side surface of the second lens.

8. The electronic device according to claim 4, wherein there are the lens assembly comprises 5 to 10 lenses.

9. The electronic device according to claim 4, wherein:
   the lens assembly further comprises a sixth lens and a seventh lens that are sequentially arranged from the fifth lens to the image side; and
   the first lens has positive focal power, the second lens has negative focal power, the third lens has negative focal power, the fourth lens has positive focal power, the fifth lens has negative focal power, the sixth lens has positive focal power, and the seventh lens has negative focal power.

10. The electronic device according to claim 9, wherein:

at least a part that is of an object-side surface of the first lens and that corresponds to the optical axis is a convex surface, and at least a part that is of an image-side surface of the first lens and that corresponds to the optical axis is a concave surface;

at least a part that is of the object-side surface of the second lens and that corresponds to the optical axis is a convex surface, and at least a part that is of the image-side surface of the second lens and that corresponds to the optical axis is a concave surface;

at least a part that is of an image-side surface of the third lens and that corresponds to the optical axis is a concave surface;

at least a part that is of an object-side surface of the fourth lens and that corresponds to the optical axis is a convex surface;

at least a part that is of an object-side surface of the fifth lens and that corresponds to the optical axis is a convex surface, and at least a part that is of an image-side surface of the fifth lens and that corresponds to the optical axis is a concave surface;

at least a part that is of an object-side surface of the sixth lens and that corresponds to the optical axis is a convex surface, and at least a part that is of an image-side surface of the sixth lens and that corresponds to the optical axis is a concave surface; and at least a part that is of an image-side surface of the seventh lens and that corresponds to the optical axis is a concave surface.

11. The electronic device according to claim 4, wherein:

the lens assembly further comprises a sixth lens, a seventh lens, and an eighth lens;

the third lens, the fourth lens, the fifth lens, the sixth lens, the seventh lens, and the eighth lens are sequentially arranged from the second lens to the image side; and the first lens has positive focal power, the second lens has negative focal power, the third lens has positive focal power, the fourth lens has negative focal power, the fifth lens has positive focal power, the sixth lens has negative focal power, the seventh lens has positive focal power, and the eighth lens has negative focal power.

12. The electronic device according to claim 11, wherein:

at least a part that is of an object-side surface of the first lens and that corresponds to the optical axis is a convex surface, and at least a part that is of an image-side surface of the first lens and that corresponds to the optical axis is a concave surface;

at least a part that is of the object-side surface of the second lens and that corresponds to the optical axis is a convex surface, and at least a part that is of the image-side surface of the second lens and that corresponds to the optical axis is a concave surface;

at least a part that is of an object-side surface of the third lens and that corresponds to the optical axis is a convex surface, and at least a part that is of an image-side surface of the third lens and that corresponds to the optical axis is a concave surface;

at least a part that is of an image-side surface of the fourth lens and that corresponds to the optical axis is a concave surface;

at least a part that is of an object-side surface of the fifth lens and that corresponds to the optical axis is a convex surface, and at least a part that is of an image-side surface of the fifth lens and that corresponds to the optical axis is a convex surface;

at least a part that is of an object-side surface of the sixth lens and that corresponds to the optical axis is a convex surface, and at least a part that is of an image-side surface of the sixth lens and that corresponds to the optical axis is a concave surface;

at least a part that is of an object-side surface of the seventh lens and that corresponds to the optical axis is a convex surface, and at least a part that is of an image-side surface of the seventh lens and that corresponds to the optical axis is a concave surface; and at least a part that is of an object-side surface of the eighth lens and that corresponds to the optical axis is a convex surface, and at least a part that is of an image-side surface of the eighth lens and that corresponds to the optical axis is a concave surface.

13. The electronic device according to claim 1, further comprising an image sensor, wherein the image sensor is located on one side that is of the lens assembly and that faces the image side.

14. The electronic device according to claim 13, wherein the lens assembly is configured to rotate around a first axis by using a first central point as a rotation center, the first central point coincides with a center of the image sensor, the first axis passes through the first central point, and the first axis is parallel to a photosensitive surface of the image sensor.

15. The electronic device according to claim 14, wherein a rotation angle of the lens assembly is between −10 degrees and +10 degrees.

16. The electronic device according to claim 13, wherein the lens assembly is configured to move in a first direction, and the first direction is parallel to the photosensitive surface of the image sensor.

17. The electronic device according to claim 16, wherein a moving distance of the lens assembly is between −1 mm and +1 mm.

18. The electronic device according to claim 13, further comprising a light filter, wherein the light filter is located between the image sensor and the lens assembly.

19. The electronic device according to claim 1, wherein the lens assembly satisfies a conditional expression: $2.22 < IH/(4*F \#) < 6$.

20. The electronic device according to claim 1, wherein the lens assembly satisfies $IH \geq 15.6$ mm.

* * * * *